US008060515B2

(12) United States Patent  (10) Patent No.:  US 8,060,515 B2
Smith-Semedo et al.  (45) Date of Patent:  Nov. 15, 2011

(54) SYSTEM AND METHOD FOR COMPUTER-ASSISTED MANUAL AND AUTOMATIC LOGGING OF TIME-BASED MEDIA

(75) Inventors: Charles Smith-Semedo, New York, NY (US); Rolando Blackman, New York, NY (US); Stephen Jacobs, New York, NY (US); Guerrino Lupetin, New York, NY (US); Rafael Cortina, New York, NY (US)

(73) Assignee: Charles Smith Enterprises, LLC, Caldwell, NJ (US)

( * ) Notice: Subject to any disclaimer, the term of this patent is extended or adjusted under 35 U.S.C. 154(b) by 0 days.

(21) Appl. No.: 12/801,981

(22) Filed: Jul. 6, 2010

(65) Prior Publication Data

US 2010/0312770 A1  Dec. 9, 2010

Related U.S. Application Data

(63) Continuation of application No. 11/050,673, filed on Feb. 7, 2005, now Pat. No. 7,756,876, which is a continuation of application No. 09/806,008, filed as application No. PCT/US00/32491 on Nov. 30, 2000, now Pat. No. 6,877,010.

(60) Provisional application No. 60/168,216, filed on Nov. 30, 1999.

(51) Int. Cl.
*G06F 17/30* (2006.01)
(52) U.S. Cl. ...................................................... 707/741
(58) Field of Classification Search ............. 707/2, 741; 386/241
See application file for complete search history.

(56) References Cited

U.S. PATENT DOCUMENTS

| 5,377,982 | A | | 1/1995 | Villarreal, Jr. |
| 5,442,390 | A | | 8/1995 | Hooper et al. |
| 5,491,815 | A | | 2/1996 | Basso et al. |
| 5,630,121 | A | | 5/1997 | Braden-Harder et al. |
| 5,655,117 | A | | 8/1997 | Goldberg et al. |
| RE35,658 | E | | 11/1997 | Jeppesen |
| 5,828,809 | A | * | 10/1998 | Chang et al. ................. 386/241 |
| 5,857,109 | A | | 1/1999 | Taylor |
| 5,907,848 | A | | 5/1999 | Zaiken et al. |
| 5,923,365 | A | | 7/1999 | Tamir et al. |
| 5,924,096 | A | | 7/1999 | Draper et al. |
| 5,983,218 | A | | 11/1999 | Syeda-Mahmood |
| 6,035,304 | A | | 3/2000 | Machida et al. |
| 6,122,559 | A | * | 9/2000 | Bohn ............................. 700/91 |
| 6,233,389 | B1 | | 5/2001 | Barton et al. |
| 6,594,634 | B1 | | 7/2003 | Hampton et al. |
| 7,756,876 | B2 | * | 7/2010 | Smith-Semedo et al. .... 707/741 |
| 2002/0133513 | A1 | | 9/2002 | Townsend et al. |

\* cited by examiner

*Primary Examiner* — Etienne Leroux
(74) *Attorney, Agent, or Firm* — Nixon & Vanderhye PC

(57) ABSTRACT

A customizable logging and content management system for indexing multimedia, including a synchronized timer object that provides a time reference upon request in connection with the media, and a logger object that logs predefined events that occur in the media by associating the events with respective time references from the timer object. A video server is provided that captures and digitally stores events logged by the logging application as media segments, and a search and retrieval engine is provided that enables the media segments to be located, retrieved and viewed based on the indexes. The system includes a graphical user interface generator that enables customized user interfaces and logging databases to be created from database tables for use in the logging application.

23 Claims, 50 Drawing Sheets

The video Server Architecture

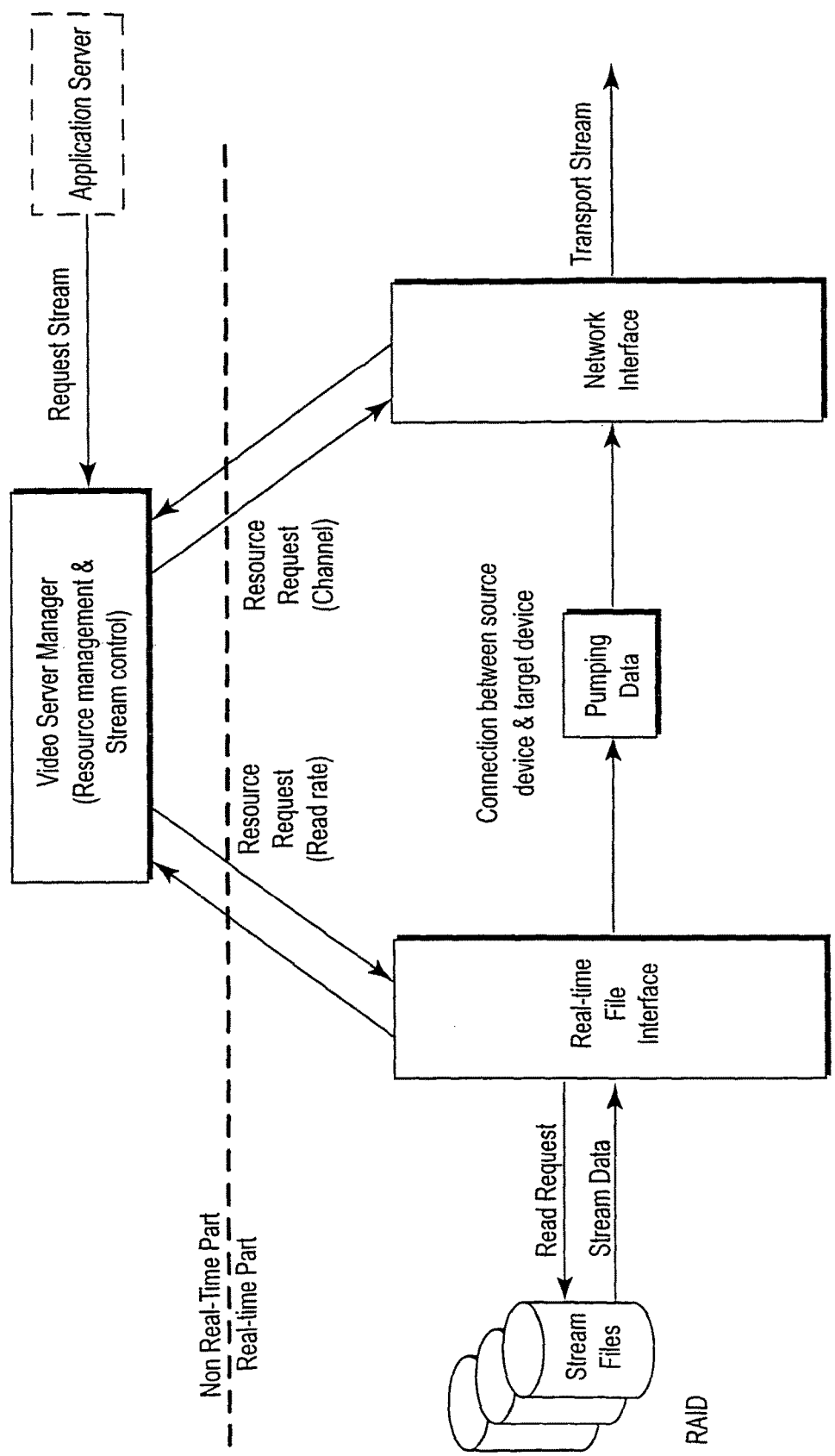
Fig.6 The video Server Architecture

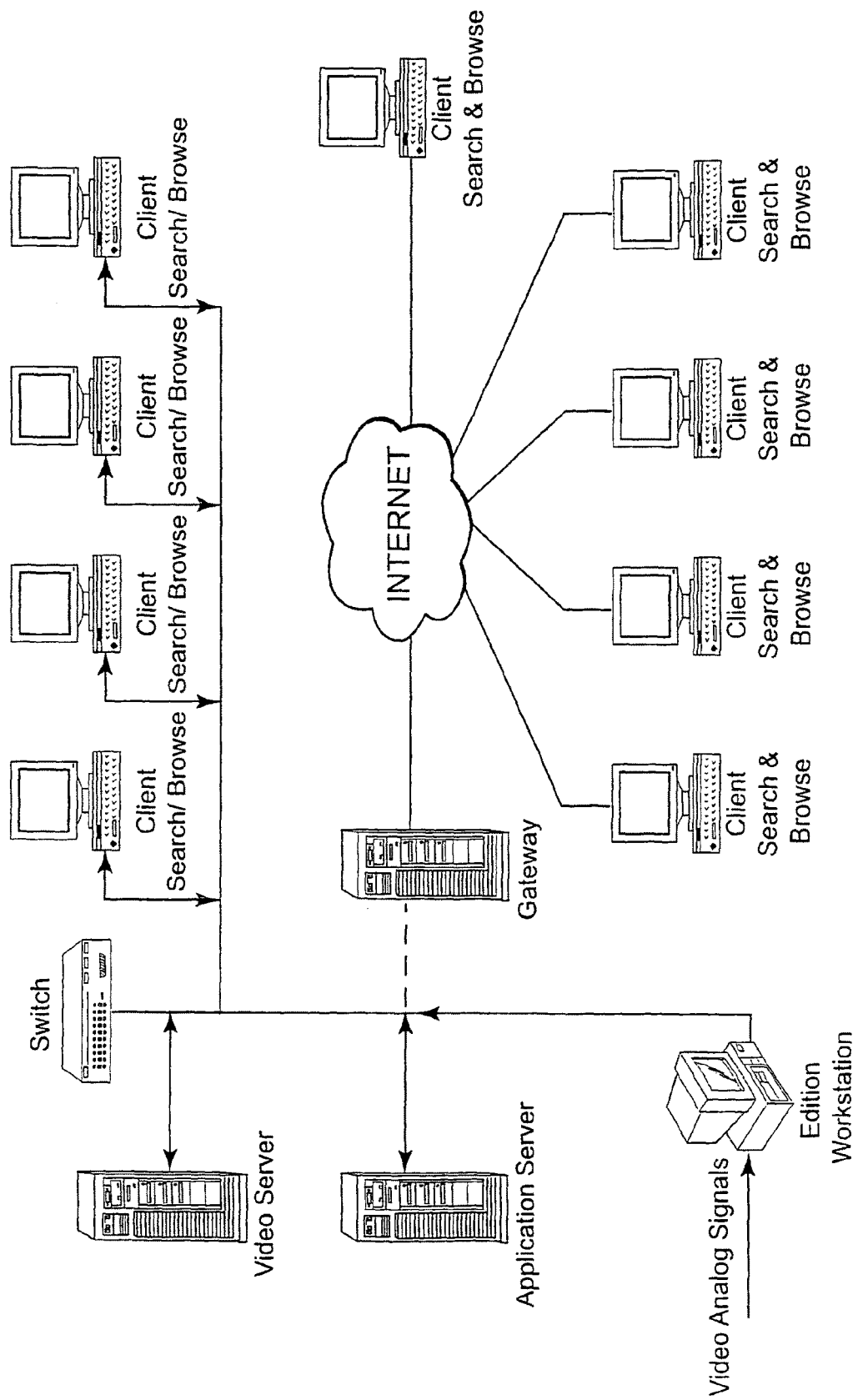
Fig.7a  The video content management system architecture

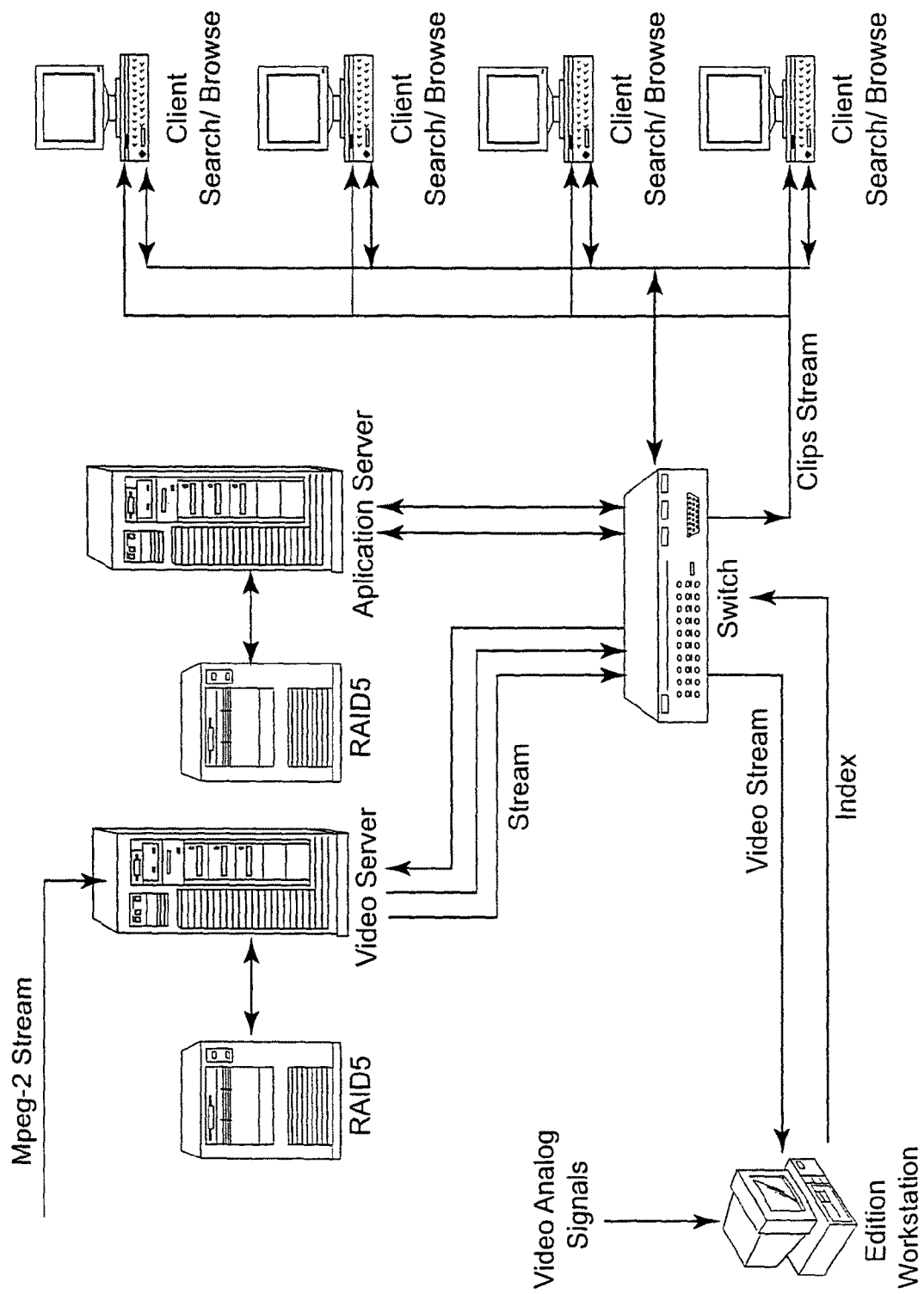
Fig.7b  The signals diagram of Video Content Management System

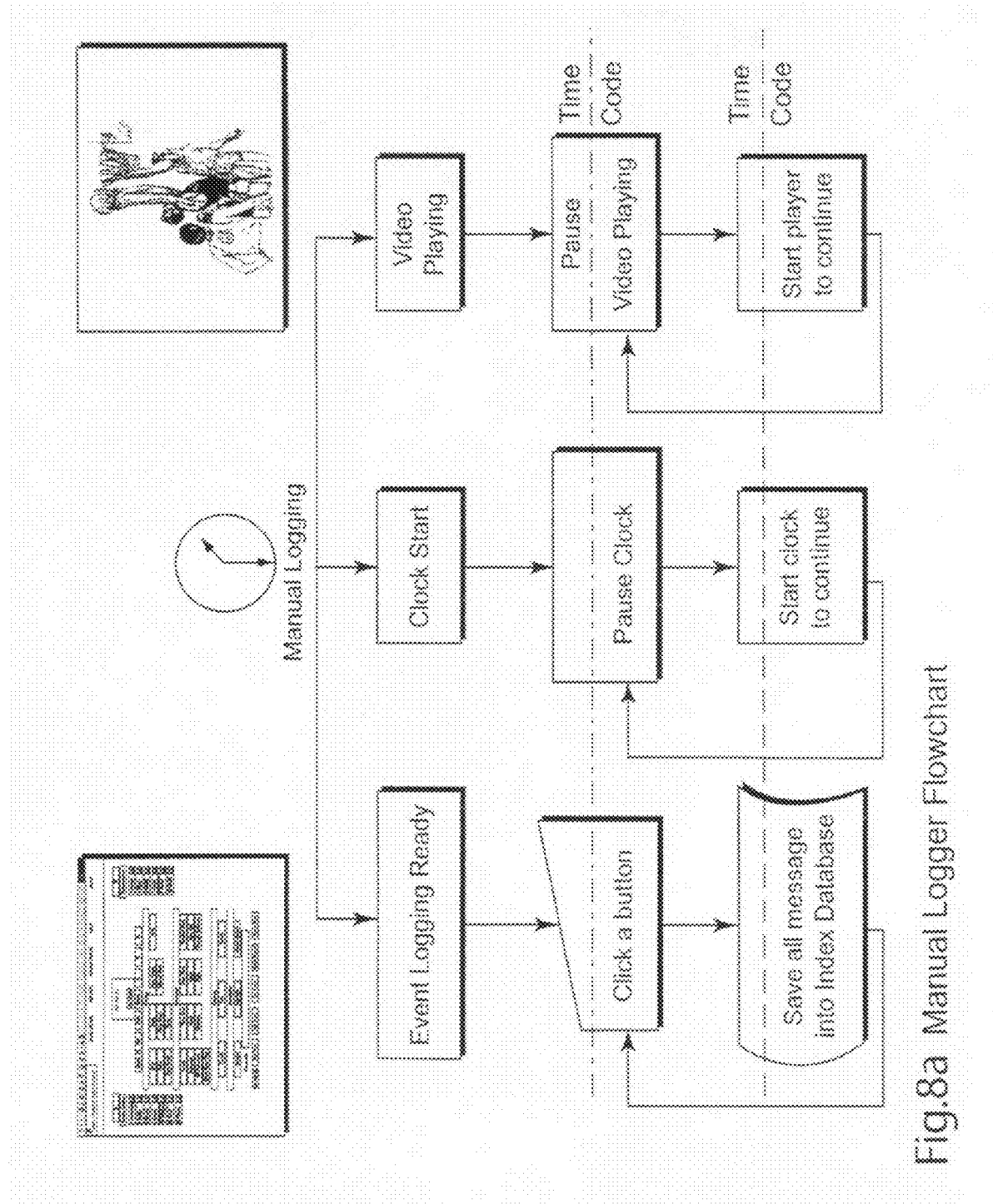
Fig.8a Manual Logger Flowchart

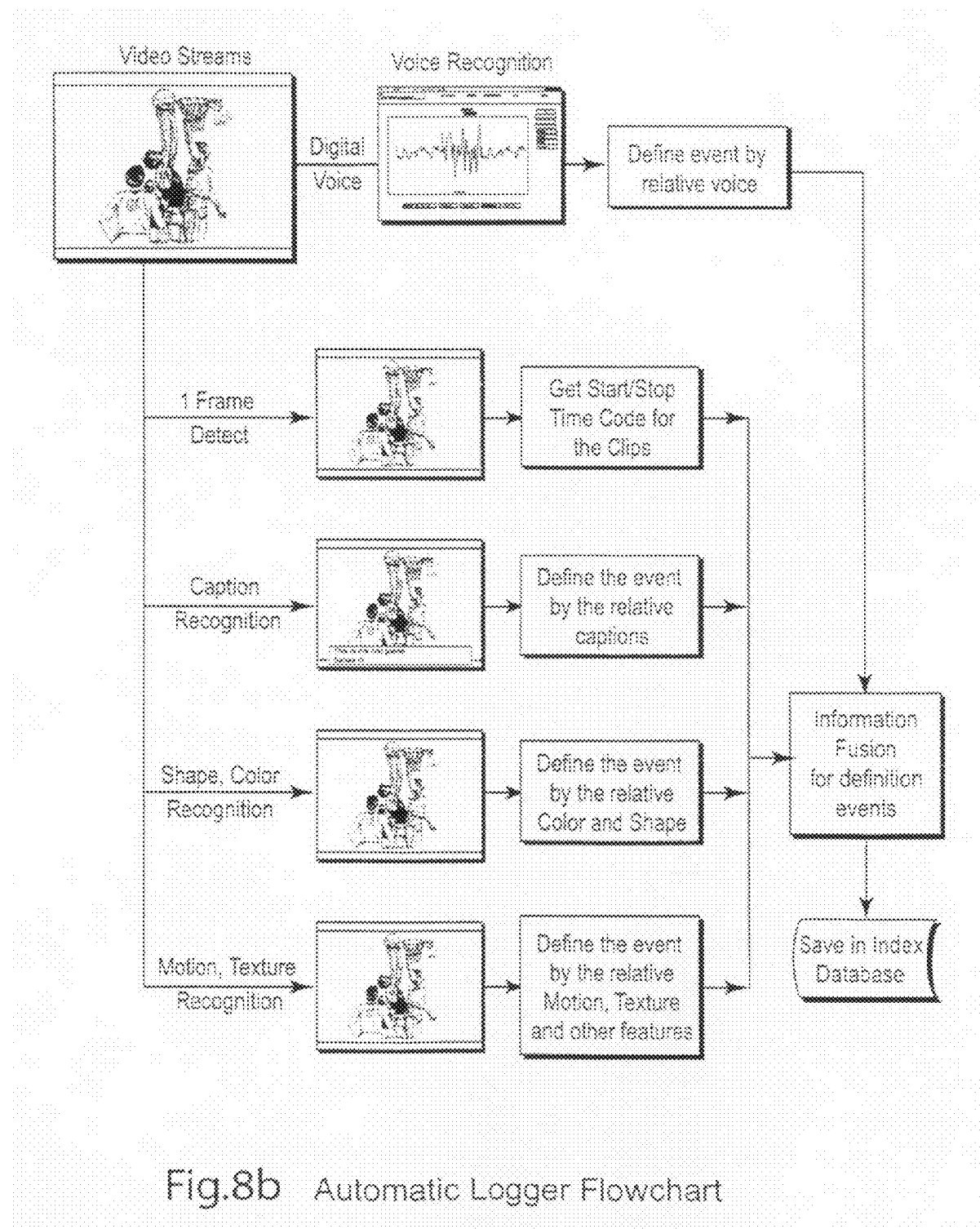
Fig.8b Automatic Logger Flowchart

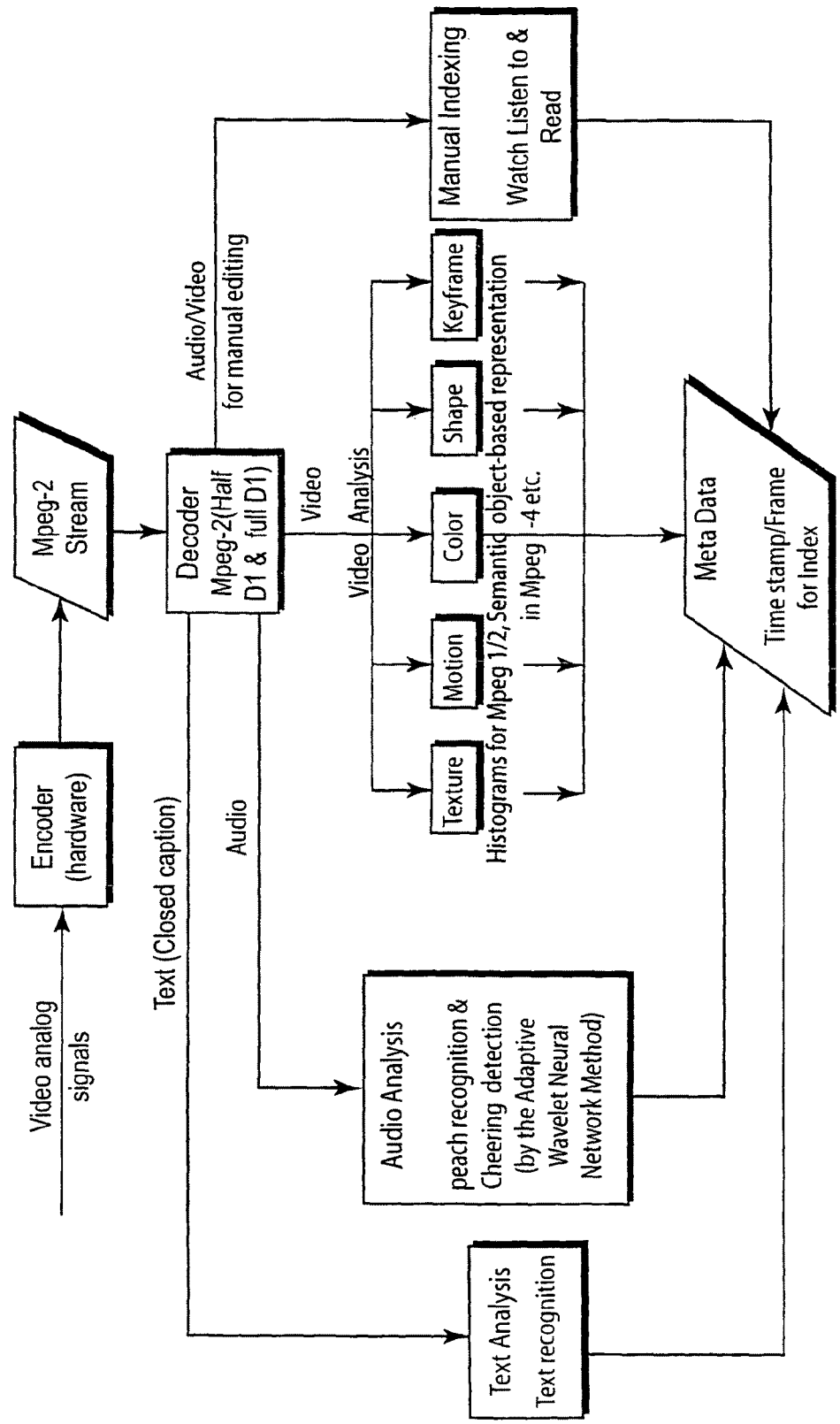
Fig.8C Video Indexing in the Edition Workstation (Manual Logger)

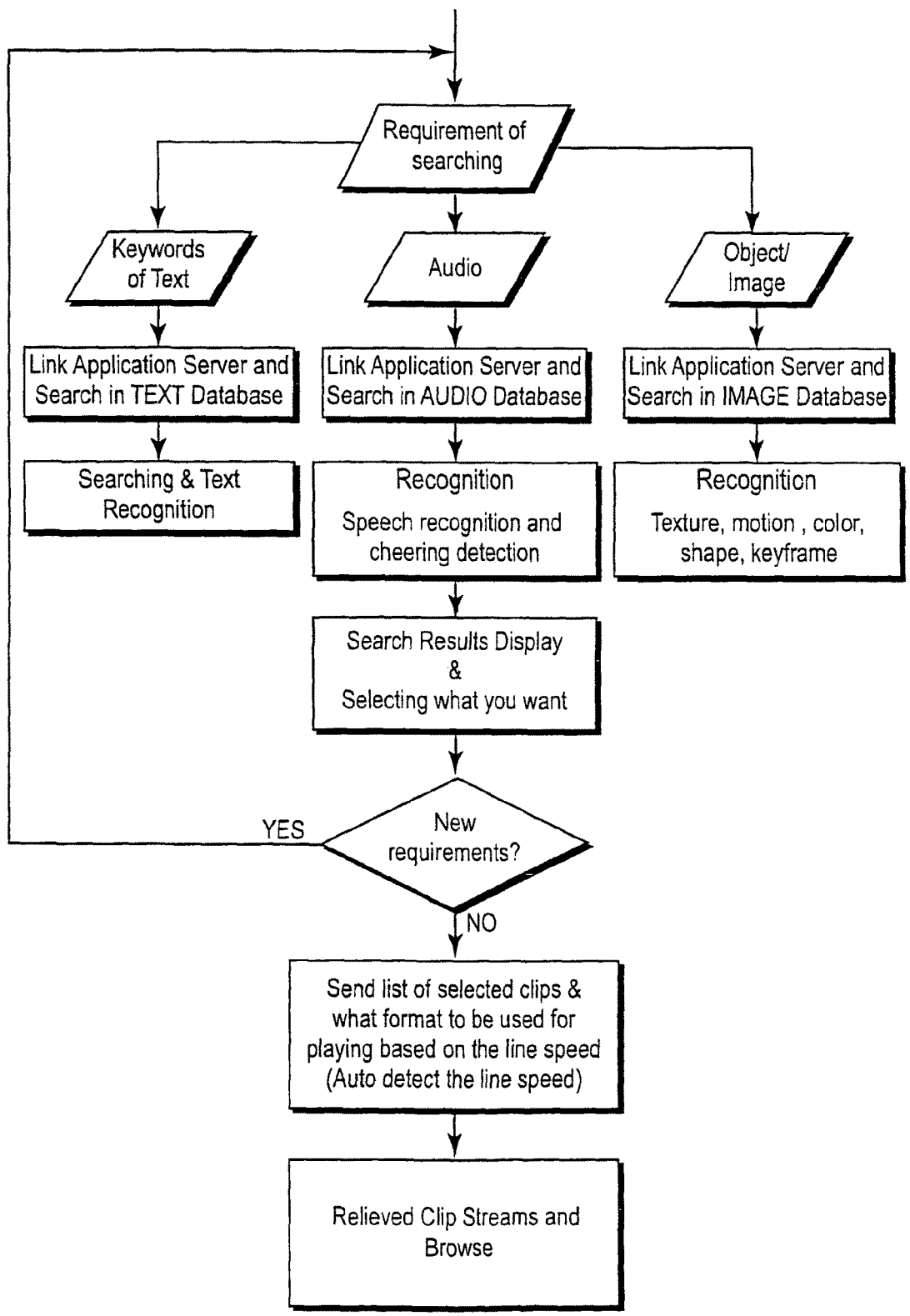
Fig.8d Search and Browse in the Clients

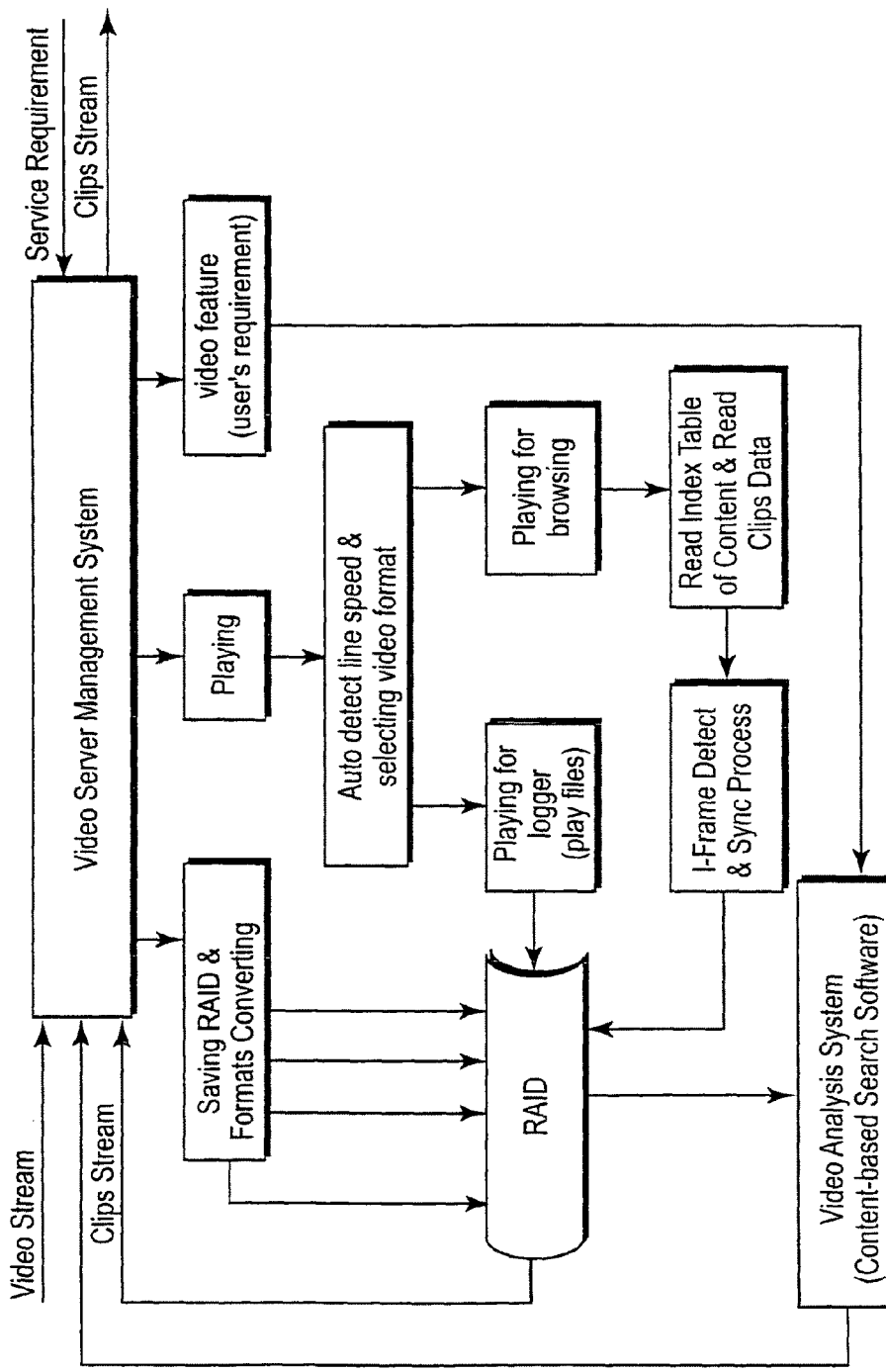

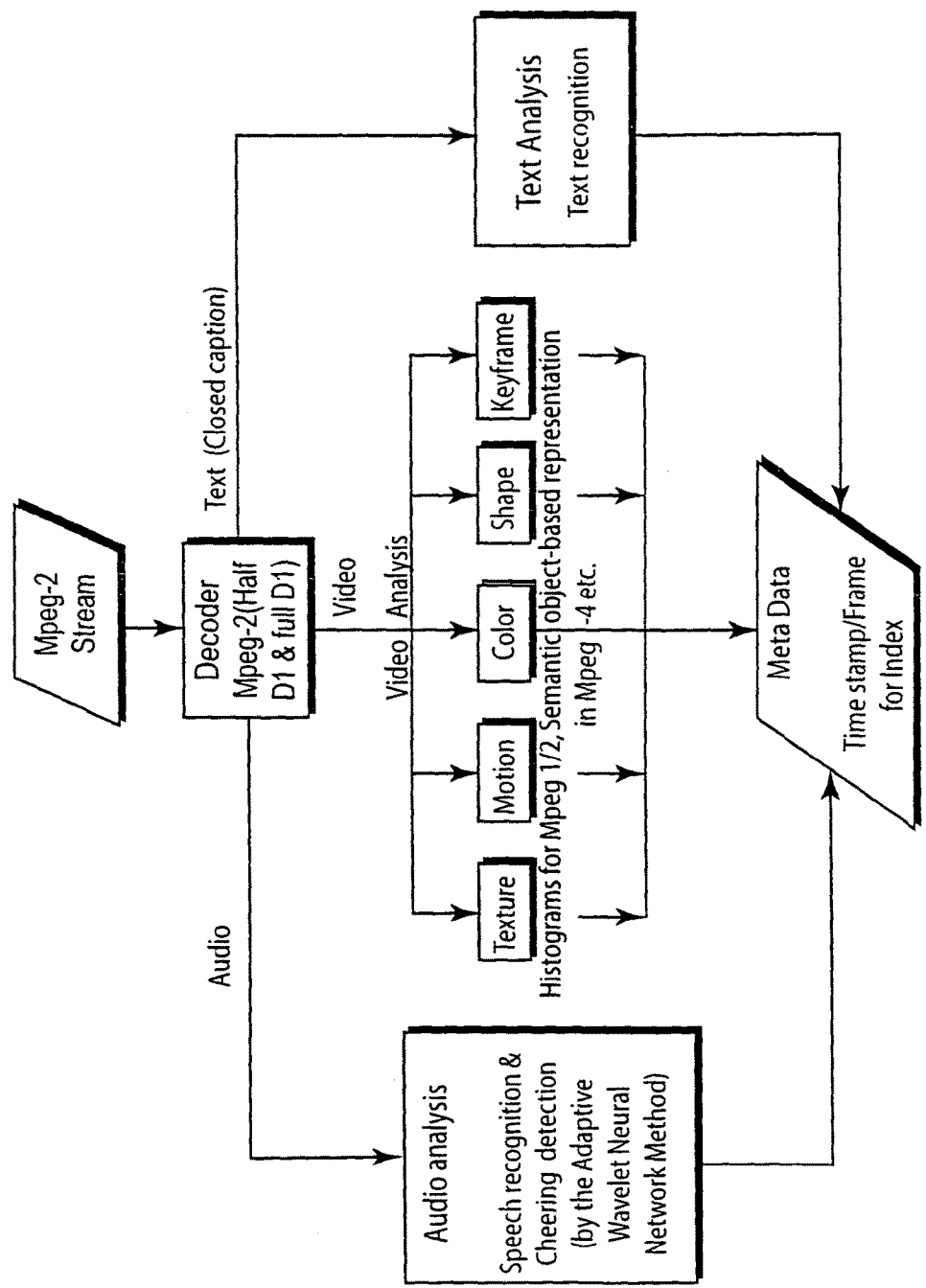
Fig.8f Video Analysis Subsystem Flow Diagram

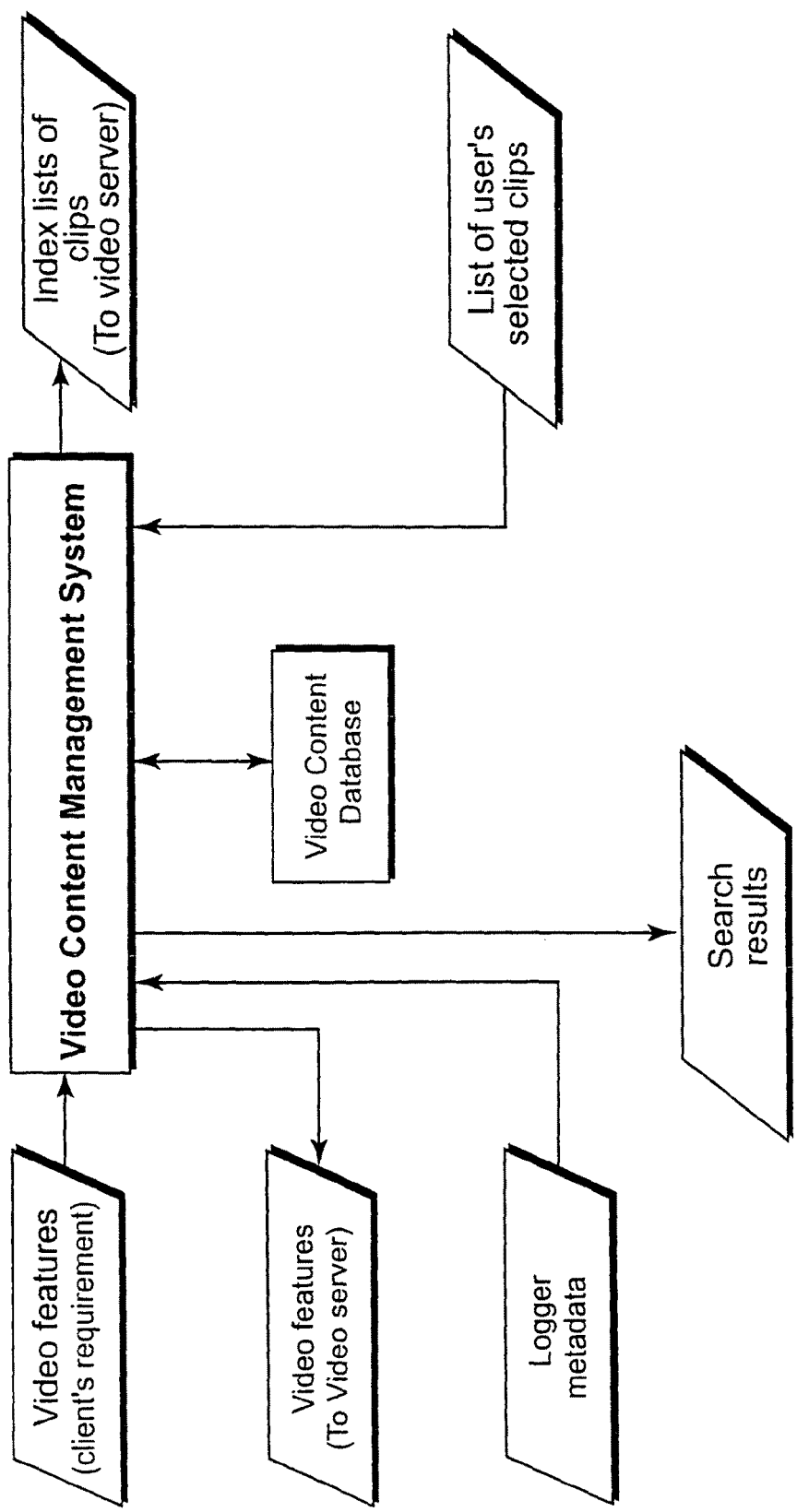
Fig.8g Application Server Flow Diagram

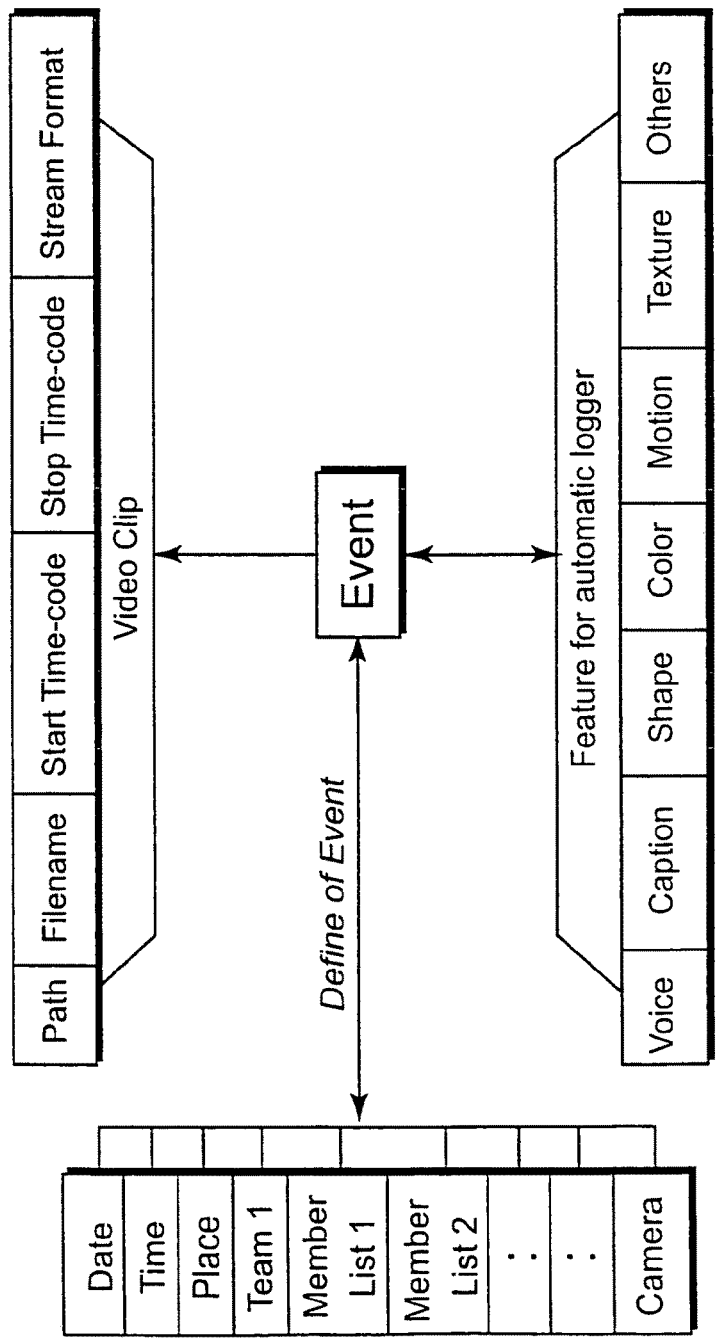

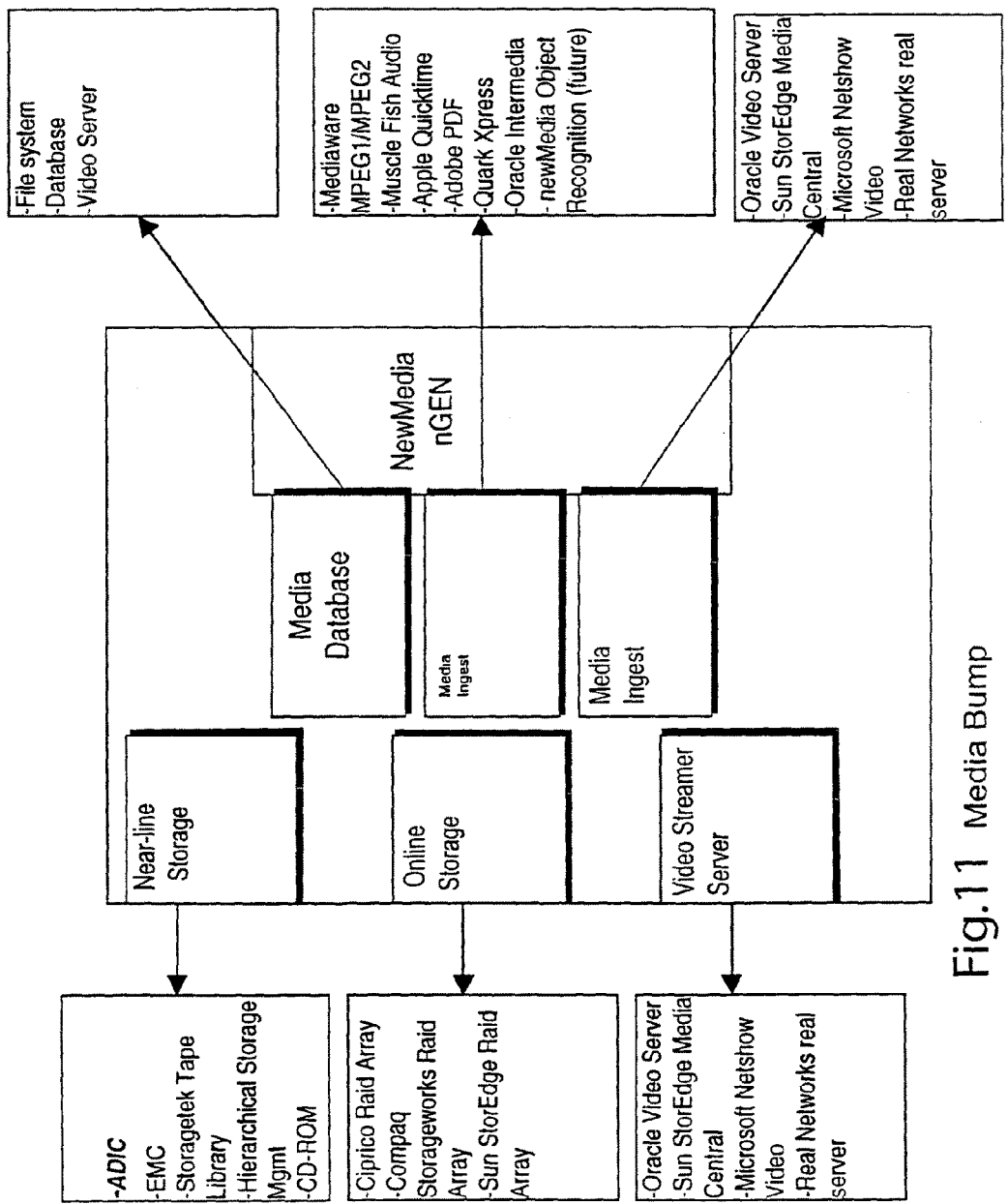
Fig.11 Media Bump

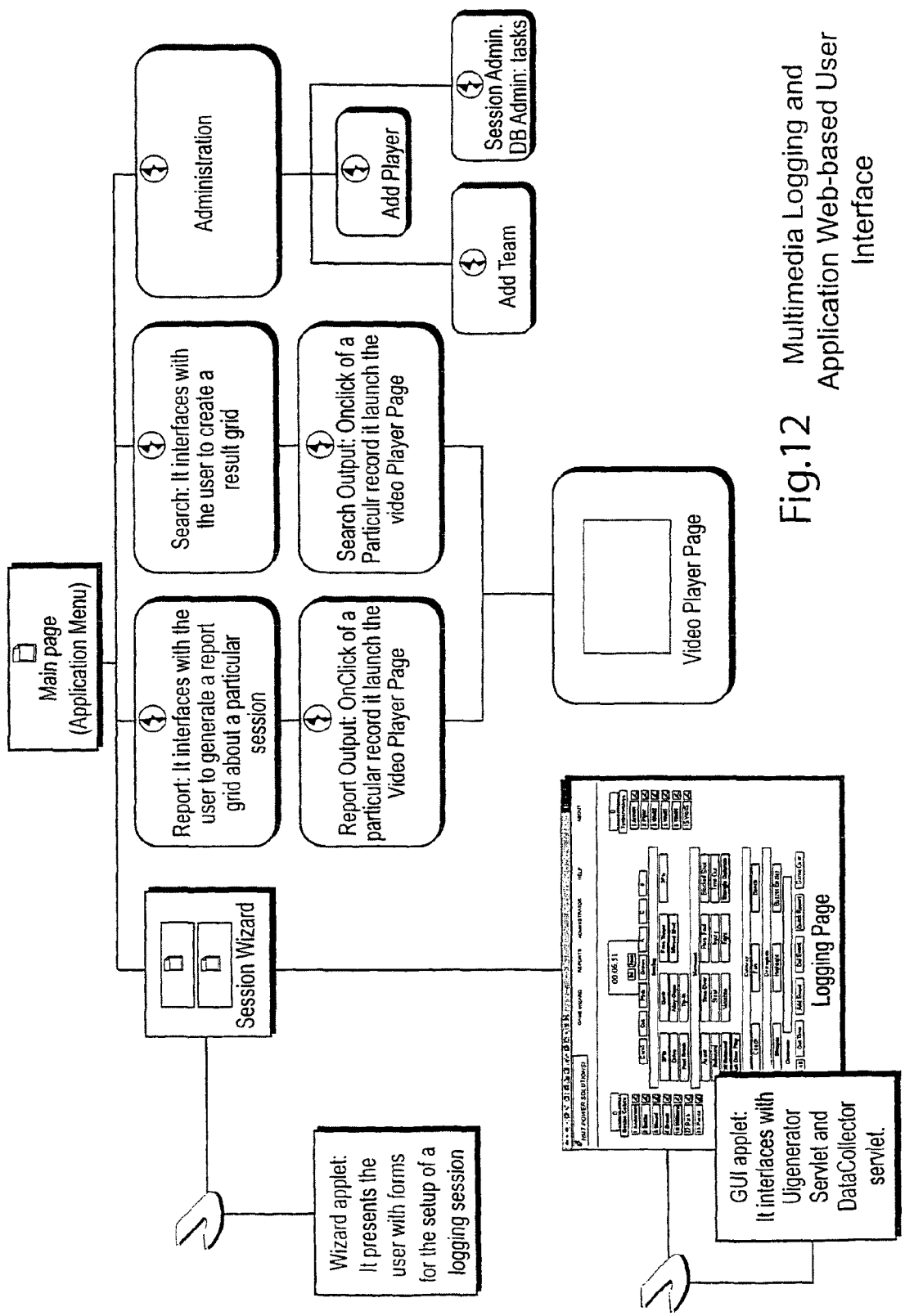
Fig.12 Multimedia Logging and Application Web-based User Interface

Database Table

| GroupName | NumberOfElems | Xpos | Ypos | bckground |
|---|---|---|---|---|
| NMT | 15 | 300px | 250px | Red |
| ComNet | 2 | 500px | 250px | |

| CustID | Cust. Name | ElmType | Dblclick | Click | GroupName | Xpos | Ypos |
|---|---|---|---|---|---|---|---|
| 1 | Charles Smith | Button | List | Select | NMT | 0 | 0 |
| 2 | Alphonso Hamilton | Button | List | Select | NMT | 1 | 0 |
| 3 | Rafael Cortina | Button | List | Select | NMT | 0 | 1 |
| 4 | Rovi | Button | List | ExSelect | ComNet | 0 | 0 |
| 5 | Cliff | Button | List | ExSelect | ComNet | 1 | 0 |

Quick Report

| Time | Boston Celtics | H.Events | H.PTS | V.PTS | V.Events | Timberwolves | Comments | cam1 | cat | Pink | Green | A | C | B |
|------|---------------|----------|-------|-------|----------|--------------|----------|------|-----|------|-------|---|---|---|
| 00:00:00 | Kenny Anderson | Violation | 0 | 0 | | | | 0 | 0 | 0 | 0 | 0 | 0 | 0 |
| 00:00:00 | Paul Pierce | Rebound | | 0 | | | Pierce Rebound. | 0 | 0 | 0 | 0 | 0 | 0 | 0 |
| 00:00:00 | Paul Pierce | | | 0 | | | Blooper. | 0 | 0 | 0 | 0 | 0 | 0 | 0 |
| 00:00:00 | Paul Pierce | | | 0 | | | Get the time code | 0 | 0 | 0 | 0 | 0 | 0 | 0 |
| 00:02:00 | | | | 0 | | | BC back door play | 0 | 0 | 0 | 0 | 0 | 0 | 0 |
| 00:02:30 | | | 0 | 0 | Bench | | Bench, The Bench, The Bench!!!!! @#$#%$%^^&*()_+ | 0 | 0 | 0 | 4 | 0 | 0 | 0 |
| 00:02:41 | | | 0 | 0 | | | Fan | 0 | 0 | 0 | 0 | 0 | 0 | 0 |
| 00:03:18 | John Williams | Bench | 0 | 0 | | | Bench | 0 | 0 | 0 | 0 | 0 | 0 | 0 |
| 00:03:31 | | | 0 | 0 | | | Coach | 0 | 0 | 0 | 0 | 0 | 0 | 0 |
| 00:03:52 | Robert Pack | Coach | 0 | 0 | | | Coach | 0 | 0 | 0 | 0 | 0 | 0 | 0 |
| 00:04:05 | | | 0 | 0 | | | Coach | 0 | 0 | 0 | 0 | 0 | 0 | 0 |
| 00:06:48 | John Williams | 2 Pts | 2 | 0 | | | Highlight. | 0 | 2 | 3 | 4 | 0 | 0 | 0 |

CLOSE

Fig.28

| | | |
|---|---|---|
| NMT POWER SOLUTIONS! | | |
| GAME WIZARD REPORTS ADMINISTRATOR HELP ABOUT | | |
| Reports | | |
| Search by [Player ▼]  Search content [        ]  [Ascending ▼]  [Search] | | |

Players List

| PLAYER | TEAM |
|---|---|
| Allan Houston | New York Knicks |
| Alonzo Mourning | Miami Heat |
| Blue Edwards | Miami Heat |
| Calbert Cheaney | Denver Nuggets |
| Charlie Ward | New York Knicks |
| Chris Carr | Chicago Bulls |
| Chris Childs | New York Knicks |
| Chris Dudley | New York Knicks |
| Clarence Weatherspoon | Miami Heat |
| Cory Alexander | Denver Nuggets |
| Dan Majerle | Miami Heat |
| Dan McClintock | Denver Nuggets |
| David Wingate | New York Knicks |
| Duane Causwell | Miami Heat |
| Eric Williams | Miami Heat |
| Evan Eschmeyer | New Jersey Nets |
| George McCloud | Denver Nuggets |
| Gheorghe Muresan | New Jersey Nets |
| Jamal Mashburn | Miami Heat |

Fig.31

NMT POWER SOLUTIONS!  GAME WIZARD  REPORTS  ADMINISTRATOR  HELP  ABOUT

Reports

Search by [Player ▼]  Search content [        ]  [Ascending ▼]  [Search]

Games List

Player : Allan Houston

| GAME | Game Date | TEAM | Time | EVENT | COMMENTS |
|---|---|---|---|---|---|
| 1222002 | 12-02-2002 | New York Knicks | 00:04:10 | | missed shot....triangle offense............ |
| 1222002 | 12-02-2002 | New York Knicks | 00:05:29 | Turn Over | Turn Over1213233 |
| 11256650 | 11-06-2000 | New York Knicks | 00:23:47 | 3 Pts | |
| 11256650 | 11-06-2000 | New York Knicks | 00:35:18 | Drive | |
| 23 | 10-26-2000 | New York Knicks | 13:03:41 | 2 Pts | |
| 23 | 10-26-2000 | New York Knicks | 13:04:40 | Time Out | |
| 23 | 10-26-2000 | New York Knicks | 13:08:39 | Free Throw | |
| 23 | 10-26-2000 | New York Knicks | 13:08:50 | Free Throw | |
| 01142000 | 01-14-2000 | New York Knicks | 00:00:10 | Turn Over | |

NMT POWER SOLUTIONS!

GAME WIZARD    REPORTS    ADMINISTRATOR    HELP    ABOUT

Reports

Search by [Player ▼]    Search content [ ]    [Ascending ▼]    [Search]

Games List

Team : New York Knicks

| Game Date | GAME |
|---|---|
| 12-02-2002 | 1222002 |
| 11-14-2000 | 13 |
| 11-06-2000 | 11062000 |
| 11-06-2000 | 11256650 |
| 10-26-2000 | 23 |
| 10-25-2000 | 21 |
| 10-25-2000 | 22 |
| 04-06-2000 | 254550056 |
| 01-14-2000 | 01142000 |

NMT POWER SOLUTIONS!

GAME WIZARD    REPORTS    ADMINISTRATOR    HELP    ABOUT

Reports

Search by [Player ▼]   Search content [        ]   Ascending ▼   [Search]

Games List

| GAME | Game Date | TEAM | Time | EVENT | COMMENTS |
|---|---|---|---|---|---|
| 1222002 | 12-02-2002 | Boston Celtics | 00:00:18 | Fan | Fan, The fans cheer for their team... |
| 1222002 | 12-02-2002 | New York Knicks | 00:00:51 | Fan | Fan, New York Fans are Cheering!!! |
| 1222002 | 12-02-2002 | New York Knicks | 00:01:50 | Dunk | Highlight,Dunk!!! 1234567890 |
| 1222002 | 12-02-2002 | Boston Celtics | 00:02:24 | Free Throw | Buzzer Beater,Buzzer Beater!@#$%^&*() |
| 1222002 | 12-02-2002 | New York Knicks | 00:02:46 | | 3-points shot!@#$##@%% |
| 1222002 | 12-02-2002 | Boston Celtics | 00:03:17 | | back-door, back door 123544879 |
| 1222002 | 12-02-2002 | New York Knicks | 00:03:40 | | oooooo, alley----------oop+++++++++++++++++ |
| 1222002 | 12-02-2002 | New York Knicks | 00:04:10 | | missed shot.....triangle offense....... |
| 1222002 | 12-02-2002 | Boston Celtics | 00:04:28 | Fast Break | Coach, coach cheering as well... |
| 1222002 | 12-02-2002 | New York Knicks | 00:04:43 | Tip-in | gagagagaga |
| 1222002 | 12-02-2002 | Boston Celtics | 00:05:09 | Assist | We Assist, We Assist, WA |
| 1222002 | 12-02-2002 | New York Knicks | 00:05:29 | Turn Over | Turn Over1213233------ |
| 1222002 | 12-02-2002 | Boston Celtics | 00:05:43 | Pers Foul | Blooper,Personal Faoul!! |
| 1222002 | 12-02-2002 | New York Knicks | 00:06:02 | Blocked Shot | when Shot is Blocked!@@@ |
| 1222002 | 12-02-2002 | New York Knicks | 00:09:51 | Steal | Bench, Buzzer Beater,Ewing Steals |

NMT POWER SOLUTIONS!    GAME WIZARD    REPORTS    ADMINISTRATOR    HELP    ABOUT

NEW JERSEY DEVILS vs. DALLAS STARS

Home Team:     NEW JERSEY DEVILS

| | | |
|---|---|---|
| DEVILS TAKE THE ICE | FIGHT DEVELOPS | HARD CHECK & PUNCH |
| SHOT ON GOAL | HARD CHECK | FACE OFF & BREAKAWAY |
| SHOT ON GOAL 2 | SHOT ON GOAL 3 | SHOT ON GOAL 4 |
| SHOT ON GOAL 5 | SHOT ON GOAL 6 | SHOT ON GOAL 7 |
| SHOT ON GOAL 8 | SAVE | SAVE 2 |
| HARD CHECK 2 | FAN - BRODEUR'S WIFE | FAN |
| FAN - "LET'S GO DEVILS" | FAN - BRODEUR'S WIFE SCARED | GOALIE: BRODEUR STUNNED |
| BREAKAWAY | | |

Visiting Team:     DALLAS STARS

| | | |
|---|---|---|
| BENCH | FACE OFF | FACE OFF 2 |
| SHOT ON GOAL OFFEN./DEF. | SHOT ON GOAL 2 | GOALIE VIEW |
| SAVE | SHOT ON GOAL 3 | SHOT ON GOAL 4 |
| FACE OFF NIEUWENDYK WINS | SCORED GOAL & CELEBRATION | SAVE/REPLAY |

Fig.45

SYSTEM AND METHOD FOR COMPUTER-ASSISTED MANUAL AND AUTOMATIC LOGGING OF TIME-BASED MEDIA

RELATED APPLICATION

This is a continuation of U.S. application Ser. No. 11/050,673, filed Feb. 7, 2005, now U.S. Pat. No. 7,756,876 which is a continuation of Ser. No. 09/806,008, filed Sep. 20, 2001, now U.S. Pat. No. 6,877,010 which is the US national phase of international application PCT/US00/32491, filed Nov. 30, 2000, which designated the US. PCT/US00/32491 claims the benefit of U.S. Provisional Application Ser. No. 60/168,216 filed Nov. 30, 1999, and entitled "A Process for the Computer-Assisted Manual Logging of Time-Based Media", the entire content of which is hereby incorporated by reference herein.

FIELD OF THE INVENTION

The instant invention relates to a multimedia asset management system for use in managing audio, video and/or multimedia information and assets. More particularly, the invention relates to a multimedia asset management system that enables capturing, indexing, cataloging, rearranging, safeguarding and redistribution of multimedia assets. The system provides, among other things, a computer assisted logging system for use in logging and capturing audio and/or video segments from a live or prerecorded event, such as a sporting events or any other time-based event that uses audio and/or video recording or broadcasting.

BACKGROUND AND SUMMARY OF THE INVENTION

Many industries such as the sports and entertainment industry require the ability to search through their archive of audio, video and/or multimedia assets and find particular prerecorded information. In the sports industry, this search and retrieval ability is needed for many purposes. For example, when scouting for new players it can be very useful to have the ability to search through an archive of recorded games to find particular events that occurred during the games. For instance, a coach may desire to review every three-point shot that a basketball player has attempted in a game or throughout multiple games. Also, a sports league may desire to collect and review many different types of events that have occurred during the course of game play. In the entertainment industry, producers need access to archival footage for highlights and many other reasons. For example, a sports television show may desire to find and retrieve particular video segments from a particular prerecorded event to show to the public during a news broadcast. For example, when broadcasting sports news, the network may desire to show every video segment from a prerecorded football game that shows a turnover of the ball from one team to another. In fact, in sports, whether from the team, league, entertainment or other related perspective, there are numerous reasons why it is important to have the ability to find and retrieve video and/or audio segments from an archive of prerecorded information (e.g., video, audio and/or multimedia assets). While the ability to manage an archive of recorded assets is particularly useful in connection with sports, such management systems are needed for many other applications as well. In fact, the need extends to practically any situation where significant amounts of audio and/or video is recorded, such as in the movie production business, where one might desire to find and retrieve a particular segment of information (audio, video or multimedia segment).

One technique that has been widely used in the past, particularly in connection with sporting events, is to use manual loggers to log information about an event that is being recorded or has been previously recorded. This technique involves using people, known as "loggers", to view the entire event as it is being recorded (or after it has been recorded) and to index certain pre-defined events that occur during the event that may be of interest to the person or organization for which the logger is working. For example, a logger working in connection with a basketball game may have the job of logging information, such as time of occurrence during the game, that particular events occur, such as fouls, three-point shots, defensive plays, or any other event that may be of interest in connection with the basketball game. The logger typically uses a log sheet on which he manually enters the event and the time of occurrence of the event for later reference. Numerous loggers may be used for any one sporting event. When the loggers are finished logging the event, the log sheets are collected and stored with the recording of the event, so that they can be used as a reference to later find particular segments of interest from the overall recorded event. For example, the log sheet may indicate that a particular basketball player made a three-point shot at a particular point in time during the game. Thus, if a person wanted to see the video segment or clip of this particular three-point shot, the log time indicated on the log sheet can be used to find the point in the recorded game where the shot occurs. Thus, the log sheets act as an index to particular segments within the overall recorded event that may be of interest at a later time. One problem, however, with this manual logging process is that it is time consuming and inefficient, in that the physical log sheets must be reviewed manually in order to find the information or event of interest. Moreover, once the index is found on the log sheet, the tape or other medium on which the event has been recorded must by obtained so that the particular video and/or audio segment can be clipped therefrom. Thus, a more efficient system is needed in connection with the logging of time based media, such as sporting, entertainment or other events.

Video editing software exists for enabling editing of recorded video or multimedia assets. However, such video editing software is very sophisticated and generally requires a knowledgeable and experienced video engineer to properly edit or obtain video clips from a video. In addition, such video editing software is expensive to purchase and operate. Thus, a less expensive and more user friendly video segment indexing and capturing system that can be used in connection with logging and retrieval of time-based media is needed.

The instant invention addresses the above-described needs by providing a computer-based indexing and capturing system for use in connection with logging of audio, video and/or multimedia events. The invention provides a user friendly tool for use by loggers or the like working in connection with a time-based media event, such as but not limited to a sporting event. Specifically, the instant invention enables loggers to easily and efficiently view a live or prerecorded event and document a time-based stamp for predefined events that may occur during the overall event. In accordance with the invention, a user-friendly graphical user interface (GUI) is provided that is customized to the particular application (and optionally for each particular logger using the system) in which the system is being used. The GUI includes user interface objects, such as check boxes, radio buttons, push buttons and text boxes, that are used by the logger to record events. The interface objects are predefined and customized for the particular asset being logged. In other words, the GUI objects are defined so as to correspond with the typical types of events that are generally of interest for the particular overall event that is being logged. In addition, the GUI objects are labeled in a manner that corresponds to the typical nomenclature of these events, thereby facilitating easy event logging by a logger through the GUI. The logged events are then stored in a database for later search and retrieval as desired. Thus, the invention enables parsing, cataloging, storing and retrieval of time based media.

In one embodiment of the invention, the system provides a linear video cataloging system designed to enable easy and efficient logging or indexing of linear (analog) video content. In accordance with this embodiment, the system enables a digital directory of linear video content to be created which facilitates precision retrieval of highlights and clips from recorded videos.

In accordance with another embodiment of the invention, a media management system is provided that accepts analog or digital video content, indexes the video content, indexes each video frame and provides for advanced retrieval of video segments of interest. Thus, in accordance with this embodiment, when a logger logs an event the logging information (index) and the actual video segment are captured by the system, thereby enabling the system to be used to search for, retrieve and actually view a logged video segment. As a result, this embodiment provides a complete video asset management system that can be used to log events and search for and retrieve the actual video segments that have been logged using a dedicated search engine.

In accordance with another embodiment of the invention, the system is provided with an automatic logging capability, wherein audio/video analysis technology is employed for speech, sound, object, and text recognition to automatically index video content and create an electronic directory of same. In other words, in this embodiment, manual loggers are not required because the system is programmed to automatically log certain predefined events using audio/video analysis technology.

The invention may be implemented in a stand-alone fashion, or it may be deployed as a client-server application for a LAN or web-based environment. The system is designed to enable multiple loggers to be operating on the same overall event at any one time. Facilities are provided for enabling all of the logged events from all of the loggers to be loaded into a common database for later search and retrieval.

In accordance with another aspect of the invention, the system is easily customizable for any event that needs logging. Specifically, the GUI can easily be customized to fit any particular application. In accordance with another aspect of the invention, a user interface generator is provided to facilitate the creation of customized, HTML- or XML-based user interfaces for the collection of standardized information.

In accordance with another aspect of the invention, a video content management system is provided wherein the end-user can perform complex search functions, such as search by film name, topic, bookmarks (using keywords), user groups, film groups, etc., and in response receive the exact desired content (film, scene or frame). This feature is designed to transform viewing habits and the manner in which people apply the use of video for work, study and entertainment. A video server is at the heart of the video content management system. The video server stores, manages and provides access to data in the form of large and complex video content files.

As will be apparent from the description below, one primary object of the instant invention is to simplify and speed up the process of manually logging audio and/or video or other time based media from a live event or a previously recorded event. The speed at which a person (the logger) can do the logging is especially critical when logging a live event, where there is limited time to perform logging functions. Another primary object of the invention is to provide a complete video content management system that not only enables efficient logging, but also provides a sophisticated search and retrieval function. It is noted that audio, video and other time-based media may simply be referred to as media in the description below, and that the invention is not limited to any particular media type.

BRIEF DESCRIPTION OF THE DRAWINGS

These and other objects, features and advantages of the instant invention will become apparent from review of the following detailed description of the invention when viewed in conjunction with the following drawings, in which:

FIG. 6 is a block diagram of the video server architecture in accordance with the instant invention;

FIG. 7a shows the video content management system architecture in accordance with one embodiment of the instant invention;

FIG. 7b a signal diagram of the video content management system of FIG. 7a;

FIG. 8a shows an exemplary flow chart of the manual logging feature of the instant invention;

FIG. 8b shows an exemplary flow chart of the automatic logging feature of the instant invention;

FIG. 8c is a schematic of the video indexing in accordance with the instant invention;

FIG. 8d is a flow chart of the search and browse feature of the instant invention;

FIG. 8e shows a flow diagram of the video server;

FIG. 8f shows a flow diagram of the video analysis subsystem used in accordance with the preferred embodiment;

FIG. 8g shows a preferred flow diagram of the application server;

FIG. 9 shows an exemplary video frame indexing format in accordance with one embodiment of the instant invention;

FIG. 10 shows an exemplary relationship between the video index, features and event database;

FIG. 11 shows a block diagram of the media pump in accordance with one embodiment of the instant invention;

FIG. 12 shows an exemplary flow chart of the logging and application web-based user interface, in accordance with one embodiment of the instant invention;

FIGS. 18-46 show exemplary screen shots for an exemplary basketball implementation of the instant invention.

DETAILED DESCRIPTION OF THE PREFERRED EMBODIMENTS

Various features and embodiments of the invention will now be described with reference to the appended drawings. It is noted that these embodiments are only exemplary and that the claimed invention is not meant to be limited to the specific embodiments described below.

An event, such as a sporting event or other time-based event, may be recorded in a variety of ways. For example, it may be recorded to one or more tapes. Alternatively, it may be digitally captured, possibly compressed and stored on some form of digital storage. The instant invention is designed to provide a management system for all types of recorded information, regardless of the manner in which it is typically recorded and stored.

Figures 1, 2:
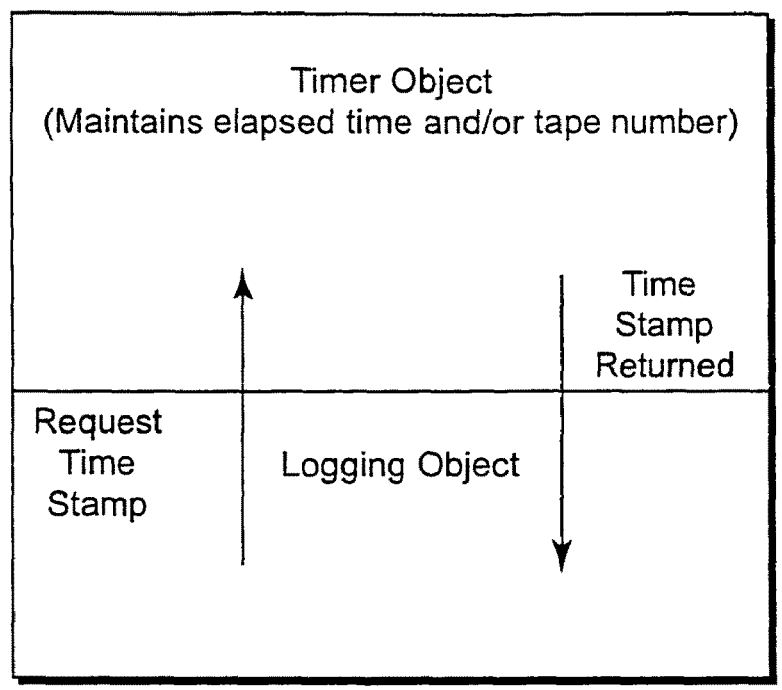
FIG. 1 illustrates the timer object and logging object in accordance with one embodiment of the instant invention.
FIG. 2 shows an exemplary and greatly simplified graphical user interface for logging events in accordance with the instant invention.

In accordance with a first and simplified embodiment, the invention includes a timer object and a logging object, as indicated in FIG. 1. The timer object keeps track of the current time code, or time stamp, of the particular media being logged. The time code can be based on either a relative or an absolute time. This time code is later used in accessing the media to jump to the correct location within an event. The logging object includes a variety of user interface objects (such as check-boxes, radio buttons, push buttons, text boxes and/or the like). The labels on the user interface objects provide access to and log information in a database of logging information, as indicated in FIG. 2. The logger chooses the desired objects that are to be associated with the current time by, for example, clicking on the objects. For example, as seen in FIG. 2, the logger may select the "player 1" and "2-point" buttons to log the fact that player 1 has made a 2-point shot in a basketball embodiment of the invention. The system would then record, using the timer object, the particular point in time (relative or absolute) when this event occurred in the course of the overall event, thereby providing an index to the overall event for finding the logged 2-point event at a later time, if desired. Thus, when an object is selected it acts as an index to the media for the event being logged. In other words, the logger object is operable to create and store the necessary information that would enable someone to locate the event that has been logged within the media. Thus, the invention eliminates the need to perform manual logging on paper.

Figure 3:
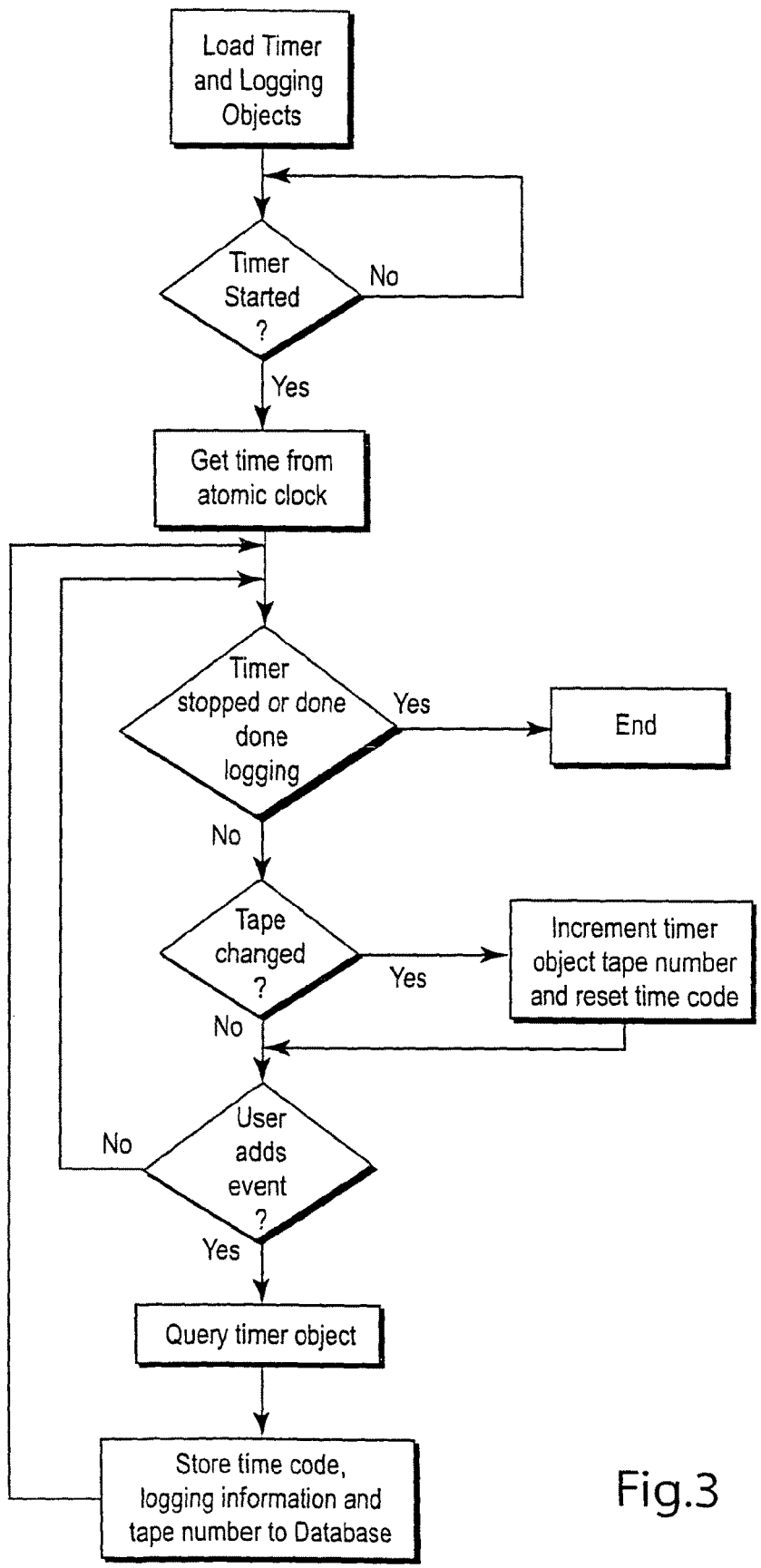
FIG. 3 shows a basic flow diagram of the logging process in accordance with one embodiment of the instant invention.

An exemplary process that is followed in order to log an event is shown in FIG. 3. The first thing that happens is that both the timer object and the logging object are loaded. The timer object then waits to be started, either manually by the logger or automatically as a trigger from some external event. If an absolute time-of-day timestamp is needed, the object sets the computer's current time of day from an atomic clock or other defined clock. The system then proceeds through a loop. The loop checks to see if: 1) the logging process is over; 2) a tape has been changed (in the case of recording to tape); and 3) if a user has added an event. If the logging process is over, the process ends. Otherwise, if the tape has been changed, the time code is optionally reset to 0 and the tape number is incremented. In another embodiment, the time code is not reset, because the time may run from the beginning of the first tape when multiple tapes are used to record the event. If a user adds an event, the timer object is queried to get the time stamp and tape number. This information is stored in a database. As indicated by the formula below, the time code may be stored as the current value of the time code minus some small period of time (delta), since by the time the button is pressed by the logger the event may have already passed:

$$T_{stored} = T_{pressed} - \Delta$$

wherein delta is a small period of time, perhaps 10 seconds, depending on the complexity of the information being logged.

The timer object maintains the current time code. This time code may be expressed differently, depending on the manner in which the media is being used. For example, the time code may be expressed in two ways—it may be expressed as the difference between the current time and some arbitrary time relating to the event (such as the beginning of the event), or it may be expressed as an absolute time in terms of the current time of day, synchronized with, for example an atomic clock.

The invention can be used for live logging with digital media capture. When capturing a live event digitally, the timer object would also be programmatically tied into the digital capture of the media. It is this capture process that knows how long the capture has been proceeding. In this case, the time stamp is simply the amount of media that has been captured, expressed in time. The trigger to start the capture (and therefore the timer object) can be manual, requiring logger action, or could be automatically generated from an external trigger or signal.

The invention can also be used for live logging without digital media capture. When capturing a live event non-digitally, the timer object would simply be a timer that keeps track of the amount of time that the media has been recorded, being careful to exclude any amount of time where recording was suspended. In the case of tape-based recording, the timer object must also maintain a count of the number of tapes being used. When the timestamp is stored to the database, the time and the current tape number are added to the database. The trigger to start the timer and also the trigger to switch tapes can be manual, requiring logger action, or could be automatically generated from an external trigger or signal.

The invention can also be used for post logging with digital media capture. When logging a digitally captured event after it has been captured (e.g., prerecorded), the timer object is a software digital media playback object, such as Windows Media Player. The video is played back and the play back object is queried for the current time position by the logging object to be stored in the database.

The invention may also be used for post logging without digital media capture. When logging a non-digitally captured event after it has been captured, the timer object is a timer that keeps track of the amount of time that the media has been playing back, being careful to exclude any amount of time where recording was suspended. In the case of tape-based recording, the timer object must also maintain a count of the number of tapes being used. When the time stamp is stored to the database, the time and the current tape number are added to the database. The trigger to start the timer and also the trigger to switch tapes can be manual, requiring logger action, or could be automatically generated from an external trigger or signal.

With respect to the logging object, each user interface object corresponds to a data field that may be logged. These data fields are retrieved from a database of frequently logged fields. In accordance with the invention, this database is completely customizable, as will be explained in detail below. The user interface objects are grouped hierarchically to make finding them easy. For example, as indicated in FIG. 3, when logging a sporting event there could be a column of user interface objects for the players on one team ("Team 1"), another column for the players on the other team ("Team 2") and a third column for the type of event to be logged (2-point, 3-point or foul, using basketball as an example).

Preferably, the user interface objects are customizable on the fly, as well. For example, a blank field at the bottom of each grouping may be provided to allow the logger to type the customized field, add the field to the database of fields, and log the event using that customized field. The choice of user-interface object associated with a data field defines the relationship between the data. Check boxes may be used to allow for multiple selections within a group. The ability to log multiple players for an event is an example of where a checkbox is used. On the other hand, a radio button allows the selection of only one item in a group. The type of event fields are an example where only one item would be selected at a time. To facilitate the speed of the logger, when appropriate, the most commonly logged item in a group will be selected at the beginning of logging a new event. For instance, in basketball, a 2-point shot may be the most common event.

In accordance with the invention, once the media has been logged, a search application (search engine) is provided for accessing the logged video segments, either digitally or otherwise. The user may enter search information (i.e. player and type of play) as search fields. The application then queries the database of stored events and creates a list of events that match the criteria. If the media is digitized and accessible, the database will also provide instant access to that media. If the media is not accessible, it provides the location of the video clip, in the form of a tape number and time code. In this manner, the logged media segments can be easily located and retrieved using the instant invention.

The invention may be implemented in a Web based embodiment.

Although it is possible to use this invention in any software environment, a web-based implementation has some advantages. For example, it may be set-up as a convenient subscriber-based system. In a web-based implementation running on a Web Browser, the timer object may reside in one frame, while the logging object is in a different frame within the same window. When the logger clicks a submit button, the logging object frame refreshes from the web server, while the timer object frame remains un-refreshed, since refreshing it would restart the time object and lose the timing information. Sample code for accessing the time object from the logging object frame is as follows:

window.parent.frames (0).TimerObject.CurrentPosition

The refreshed logging page has all but the default check boxes and radio buttons cleared, as well as a recap of the previous item added to the database.

The above description has provided a general overview of the main features of the logging aspect of the instant invention. Additional exemplary embodiments and further features of the invention will now be described in connection with the remaining drawings.

Preferred Implementation Details

Generally speaking, this invention provides a multimedia asset management system for individuals and enterprises that manage large volumes of video and multimedia information and utilize such information as an integral part of their business operations, or whose core business can be enhanced through the effective management of multimedia content. In other words, the invention provides a business solution to information-intensive companies who require capturing, indexing, cataloging, rearranging, safeguarding, and redistributing of their multimedia assets. This system does not address digital image creation, manipulation, and editing, nor does it enable digital artists to create imagery or transform graphical art for visual entertainment. Instead, the system is designed to manage digital assets. Specifically, the system is designed to parse, index, store, and re-broadcast compressed video information over, for example, the Internet, virtual private networks, and 100 base-t local area networks. The basic functions of the system include:

1. Capturing linear (analog) and non-linear (digital) video content;
2. Encoding the video content into MPEG format;
3. Indexing each video frame, creating an electronic directory;
4. Storing the video content as to facilitate customized retrieval, and
5. Re-broadcasting compressed video in digital quality.

The system preferably manipulates and manages video information while in a compressed form. This minimizes the storage and processing requirements of the application while improving the quality of the video content. The system is operable to dynamically construct and maintain an electronic directory by accepting user-generated or system-generated references. Object recognition, speech recognition, and text recognition may be incorporated to enable the system to automatically create detailed directories of indexes to the content.

The invention uses a broad range of enabling technologies that facilitate the creation, management, and commercialization of a digital video library (DVL). The system may be designed as a client-service application that can be deployed in a LAN or Internet environment. Alternatively, the system may be implemented in a stand-alone embodiment.

The system is preferably highly modularized and is divided into six major sub-units: Capture Bridge, Media Pump, Database Mechanism, Web Server, Client Management, and Operation Support System (OSS). The OSS integrates the overall system by logically associating all services and application management into a single environment. The application is preferably designed to accommodate different market segments.

Figure 4:
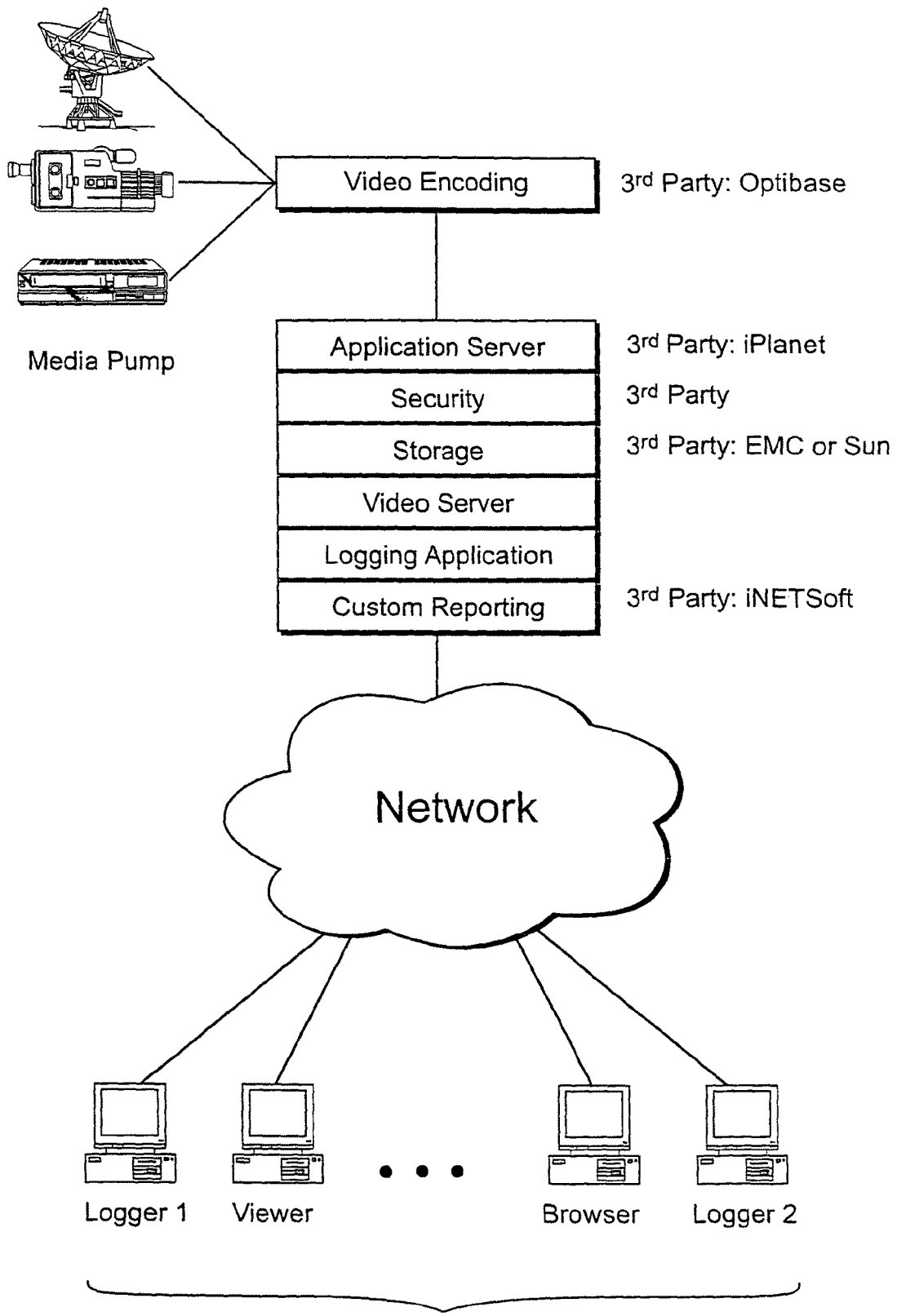
FIG. 4 shows an exemplary schematic diagram of an overall system in accordance with the instant invention.
Figure 5:
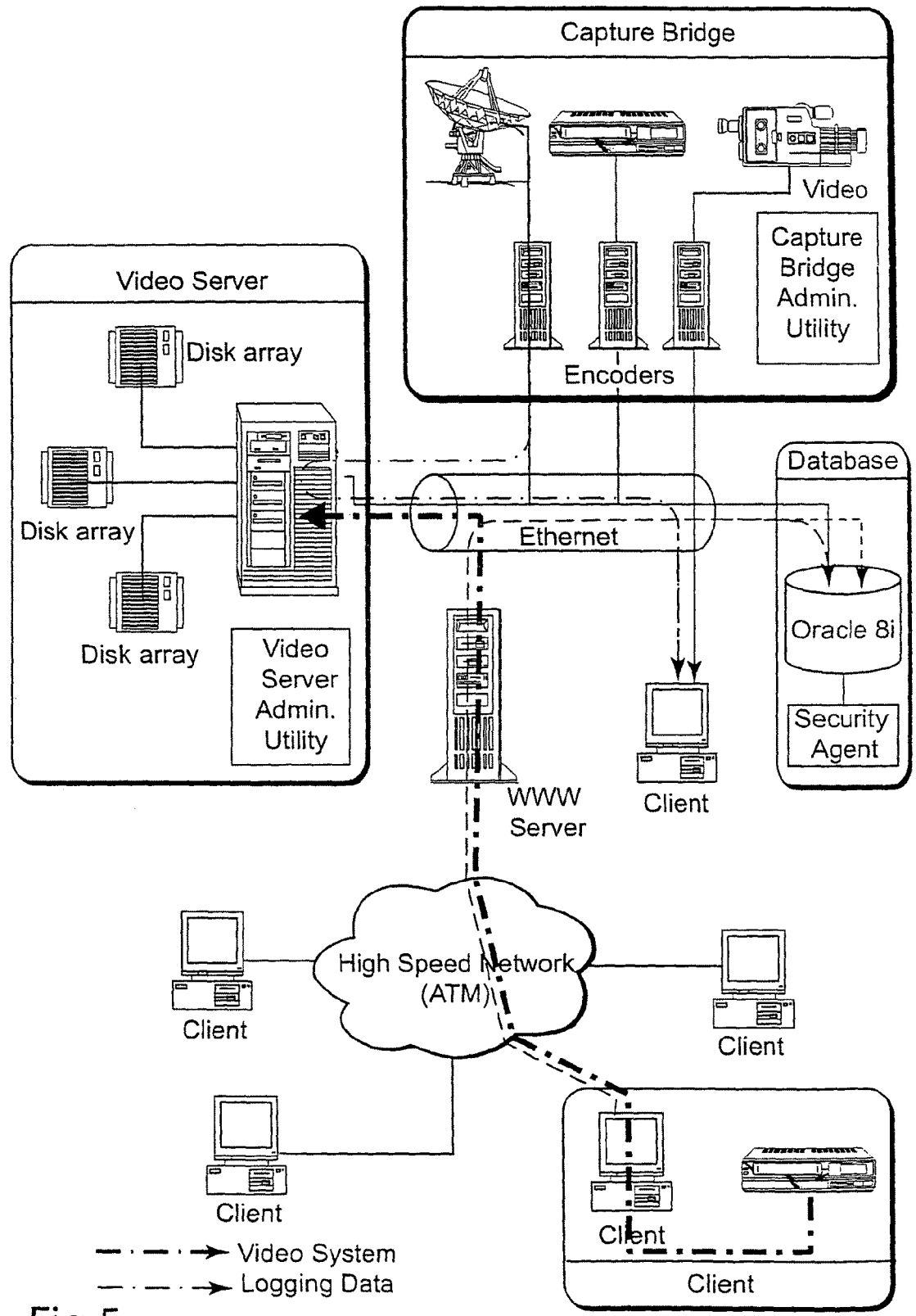
FIG. 5 shows an exemplary schematic diagram of the main components of the system of FIG. 4.

FIGS. 4 and 5 provide two illustrations showing the overall system in accordance with a preferred embodiment of the instant invention. The system includes a capture bridge for capturing media, such as by satellite, video camera, video recorder/player or other device. This capture bridge is the hardware abstraction layer (HAL) for hardware-based encoders. It enables the utilization of a variety of third parties' hardware encoders in addition to enabling a single encoder to be shared across the network through COM and CORBA. The system supports simultaneous video streaming requests from multiple clients through a single decoder (using COM this would be done using Connection Point Interfaces). As can be seen in FIG. 5, the capture bridge includes a capture bridge administration module. This Administration utility is a web-based application that can run remotely. It allows an administrator to control critical encoding features.

As can be seen in FIGS. 4 and 5 another main component is the media pump. A block diagram of the media pump is shown in FIG. 11. This module preferably interfaces with most of the third party video servers already in the market, by using the URL format to specify the path to a file resource. These include (Real Networks, MS NetShow Theater). The media pump includes an application server, a security module, a storage module, a video server, a logging application, and a custom reporting module. As indicated in FIG. 4, many of the elements of the system employ $3^{rd}$ party software. However, the video server and logging application have been developed specifically as part of the instant system. Thus, these two parts will be described in greater detail below.

The video server preferably has the following features:
Connection setup upon client request;
Validate multimedia request with security component;
Generate stream from multiple sources as specified in client request;
Stream multimedia content specified by client;
Receive incoming stream and store on file system;
Cross platform.

The video server is preferably administered through a web-based user interface that can be used from a remoter host.

The video server is the heart of the video content management system. A video server is in some ways similar to—and in many ways quite different from—the familiar file server used for management and storage of programs and data files in a personal computer network environment. Like a file server, the video server must store, manage, and provide access to data. The video server is different, however, in that it must store and manage inordinately large and complex video content files rather than small, simple programs.

The video server system preferably satisfies the following requirements:

1. Can deliver a different video stream or application for each user.
2. Can allow all users to access a single video stream or application.
3. Can deliver any requested item at any time to any user, without a significant delay.
4. Can deliver over one hundred digital video streams simultaneously.
5. Provides broadcast-level quality with industry-standard-format digital video (this implies 6 Mb/s MPEG-2 streams).
6. Stores over one hundred video streams, each of which has several hours of contents.
7. Delivers the contents, in digital format, through an Intranet or Internet network.
8. Can be expanded, both with regard to throughput and contents, without significant changes.
9. Provides a variety of types of multimedia applications.

Requirements 1-3 imply that the system must be able to deliver the full contents of any video file at any time. Requirements 4 and 5 mean that the system must have an aggregate bandwidth of over 600 Mb/s. Requirements 5 and 6 mean that the system has over half a terabyte of storage. Requirements 5 and 7 imply that the contents must be encoded in 6 Mb/s MPEG-2 streams with an MP@ML (Main Profile@Main Level) format defined in the standard for digital broadcasting and must be delivered without any conversion, such as digital to analog, in the transmission stage. Requirement 9 means that in addition to providing file transfer from server to clients, the system must have application protocols for interactive operations between clients and server.

The preferred video server architecture is shown in FIG. 6. The core techniques are the stream deliver and stream control. They involve two interface devices, RAID controller (Real-time file interface) and network controller (network interface).

In general, there are two schemes for transmitting data streams from server to client: pull and push. The former is based on packet transmission with appropriate flow control between client and server. For instance, the TCP/IP protocol is a pull scheme, which can transmit data with no loss of packets. This protocol requires processing power for dealing with protocol-stack handling. Many difficulties exist. For example, if a CPU is switched to another task, the transmission process is interrupted, and the stream is not delivered with continuity. In the worst case, the user sees a broken video image on the screen of the client, even though the packets of the stream are not lost. This situation will be even more serious for higher-bit-rate streams, since data of the stream in the decoder of the client are consumed at the bit rate specified during the encoding process, and the transmission of each packet of the stream must keep up with the decoder's rate of consumption. In addition, the server must support multiple users simultaneously. Thus, the overhead of protocol processing is higher at the server side, and it is difficult to maintain the data transfer at the required rate.

On the other hand, the push scheme is similar to a broadcasting approach. Once a stream file has been opened with a specified transfer rate, the server keeps transmitting the stream data at that data rate. Since there is no flow control between server and clients in this scheme, the processing power needed for the stream can be minimized at both sides. This means that the server can support the transmission of a higher-bit-rate stream for many users and can continuously supply streams of data to the decoders of clients. In order to meet the requirements described in the previous section, the instant invention preferably uses the push scheme.

As for the data format of the stream, the MPEG-2 transport stream is preferably used in order to minimize the overhead of the transmission while keeping the original quality, since the stream consists of fixed-size packets and its transmission is based on synchronization between the sender and the decoder of the recipient. Furthermore, this format allows multiple streams to be multiplexed naturally into a single stream. Therefore, the format is suitable for the transmission of digital video in a broadcasting mode. On the other hand, transmitting an MPEG-2 "program stream," which is suitable for use with storage media like DVD (digital video disc), requires appropriate flow control, in order to avoid underflow in the decoder buffer. This is more difficult to manage for large-scale video delivery.

The instant video content management system requires mechanisms for controlling the stream in various ways, with VCR-like (videocassette recorder) operations at any time and with no significant delays. Therefore, the control path between client and server should be full-duplex in order to maintain interactive operations. This path enables communication between client and server through use of the TCP/IP protocol.

In a push scheme, a stream of video (MPEG-2 transport stream) is delivered continuously from server to client. This unidirectional communication path may be referred to as the "down channel".

There are several ways for handling requests from clients. The most frequently used are the queuing method and the RPC (remote procedure call) method. Though the former method is rather simple and makes it easy to isolate the client and the server, a bottleneck of requests can occur when the number of clients is large. If some user's request takes a long time for processing, the request queue for client requests can fill up, and the server may not be able to respond to the clients quickly. On the other hand, the RPC model establishes a path between the server process and each client process, and control is easily passed from the client process to the server process; thus, users' interactive operations can be dealt with without significant delay. As a result, the instant system preferably uses the RPC model.

As for controlling streams and application objects, the system preferably uses the command set of DSM-CC, a part of the MPEG-2 standard. This command set supports not only stream-control operations and file-related controls, but also application-protocol management between client and server. It covers the requirements of a variety of multimedia applications in this interactive television system.

The video content searching algorithm is divided two parts: searching based on manual logger and searching based on automatic logger. The first algorithm is based on searching in an index database, and the second is based on the voice and image recognition technology. In the first searching algorithm, the event searches in the index database, but the time-code comes from I frame detection. That means all clips start from an I frame and stop on an I frame.

The index database shows the relationship between an event and a time-code of the video stream. In the automatic logger there is a feature database which shows the relationship between an event and features (such as: caption, shape, color, motion and so on). The searching event is converted searching features and gets the relative time-code. FIG. 8a shows an example flowchart of the manual logger, while FIG. 8b shows an example flow chart of the automatic logger.

FIG. 9 shows an exemplary video frame indexing format that can be used in accordance with the instant invention. FIG. 10 shows the relationship between the video index, feature and event database, in accordance with one embodiment of the invention.

FIG. 7a shows an exemplary architecture for the video content management system of the instant invention. FIG. 7b provides a diagram showing the signal paths for the embodiment of the video content management system of FIG. 7a.

FIG. 8c shows the video indexing in accordance with a preferred embodiment of the instant invention. FIG. 8d shows a search and browsing function flow provided by a preferred embodiment of the instant invention. FIG. 8e shows a flow diagram of the video server. FIG. 8f shows a flow diagram of the video analysis subsystem used in accordance with the preferred embodiment. It is noted that both FIGS. 8f and 8c demonstrate the automatic logging feature of the present invention, wherein audio, video and/or text analysis are used to do automatic logging. In other words, in accordance with the invention, audio, video or text analysis (texture, motion, color, shape, keyframe) technology may be used to perform automatic logging of events. FIG. 8g shows a preferred flow diagram of the application server.

FIG. 12 shows how the instant invention may be implemented as a multimedia logging and application Web-based user interface. In the Web-based embodiment, the application is a series of Web pages that interact with the user by running different components and modules. The platform of the Web application is preferably any Java-enabled browser such as Microsoft's Internet Explorer or Netscape Navigator.

The user interface may be hard coded for each application in which the invention is being used. For example, if the system of the instant invention is designed for a sports application, the user interface can be hard coded to provide the appropriate buttons and other interface objects that correspond to the types of events that one would desire to log in connection with the particular sporting event. Of course, each sport would have different needs. Thus, the system could be manually recoded to provide the appropriate customized interface for each application.

On the other hand, in accordance with another aspect of the invention, a GUI generator may be provided that will enable the application to be customized automatically for any situation or event without the need to make coding modifications. In other words, the system is preferably programmed to be customizable on the fly by enabling user interfaces to be automatically generated based on entered information by the user, thereby avoiding the need to hard code the interfaces. This feature makes the invention very flexible and customizable because it is database driven.

Specifically, the formation of the GUI and the logging database is database driven, i.e. is based on information in an administration database that can be edited using the system. In other words, the database fields in the logging database (as well as the GUI itself) are also database driven, i.e., they are dynamically generated based on the information in the administration database. Thus, there is a dynamic generation of the GUI and the logging database structure and properties based on user-defined input. Accordingly, this customization feature provides a customizable access module (CAM) that builds the GUI and the logging database. Thus, the GUI generator preferably does all of the following things based on information entered in the administration database:

1) creates the GUI;
2) assigns properties to the GUI objects;
3) builds a logging database (or expands or modifies an existing logging database); and
4) defines properties for each field in the logging database.

The following description explains how the instant system is able to create customized HTML- or XML-based user interfaces for the collection of standardized information. In accordance with this feature, a user interface generator (UIGenerate) and a GUI applet are provided for the creation of the customized HTML-based user interfaces.

Specifically, the GUI applet connects with the UIGenerator procedure and passes a series of parameters indicating what tables to use for the creation of the user interface. The GUI applet receives the information from the UIGenerater procedure and constructs the graphical user interface based on this information. The communication between the GUI Applet and the UIGenerater procedure is preferably based on XML so that it can be extended as desired. The GUI applet collects the GUI elements selected by the user and transmits them back to the UI Generator. The UIGenerator connects to both Oracle and MSSQL database engines. It retrieves the set of element to be rendered into the generated user interface from user-specified tables in the database and/or SQL stored procedures. The UIGenerator receives a list of elements from the GUI applet and inserts that information into an appropriate table in the database. The table where the insertions will take place is preferably parameter-specified. In addition this table can be related by a foreign key. Thus, this process can all be done through the use of a generic SQL stored procedure. The UIGenerator will connect to a database (Oracle, MSSQL) and retrieve a table from the database specified.

The description of the controls that are stored in the database table, should include provision for the behavior of the controls. Namely, the on_click, on_dlb_click function will contain different behavior for different controls. For example when one of the controls is clicked, the color of that button should change. This indicates to the user that the button has been selected. In addition every element belongs to a group. This can be a table or frame. If there are n elements that belong to a group g and group g displays only m elements where m<n then behavior can be added to the elements of group g. When the user double clicks on one of these elements the element is preferably replaced by a drop list that gives the choice of changing the element to any of the elements in group g. If the database tables to generate the GUI do not use buttons, but some other control, like textboxes, the behavior should be defined on the component through the use of the on_click and on_dlb_click functions. The on_click function changes the type of font on the selected element, while the on_dbl_click gives the option of changing the element's value by means of a drop list or enables the user to type in the textbox (enables the textbox for writing)

Preferably, the insertion process into the database should not take more than one second. The GUI applet should return a feedback string to indicate the confirmation of the insertion.

Preferably, there are two tables in the database to define the user interface. One of the tables defines the Groups (HTML tables, in this case). The other table contains the elements with their attributes, methods and properties. This component's purpose is to query the database for information regarding the user interface to be generated.

In this embodiment, the input parameters are:
1. Database Name to connect to
2. Table or Store procedure
3. Parameter Structure The table or store procedure will return a recordset with a number of rows. The component will use the different columns to generate a table of buttons with all the attributes specified in the columns, thereby automatically generating a customized user interface.

Figures 13, 14, 15:
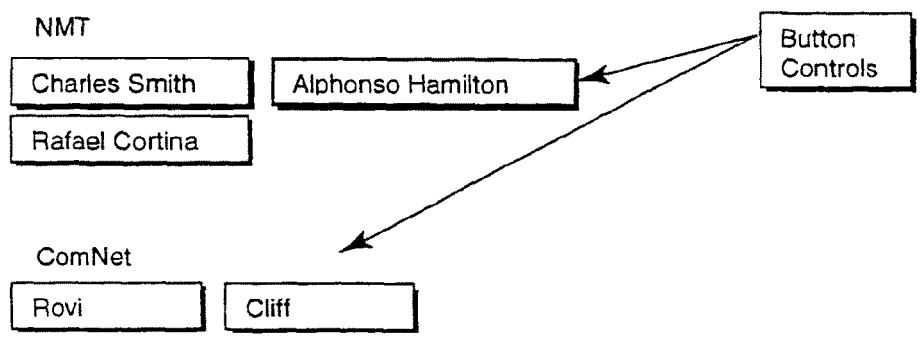
FIGS. 13 and 14 show exemplary database tables used in accordance with one embodiment of the instant invention.
FIG. 15 shows the resulting output of the GUI generator using the tables of FIGS. 13 and 14.

FIGS. 13 and 14 show examples of two tables in accordance with this GUI generator embodiment. The resulting output of these tables by the UI generator is shown in FIG. 15. It is noted that the servlet should be extensible so that one can add more parameters to the database as desired. For example, if one wanted to add the color attribute to the HTML object (Button in this case) one would add a column named color. In addition, functionality such as client script and behavior can be added. In one embodiment, the whole description of the object could be just a string. For example: After the Cust Name field, one could have a string field named HTMLstring:

<INPUT type="submit" value="Ok" id=OK name="Ok" LANGUAGE=javascript onclick="return submit1_onclick( )">

Figure 16:
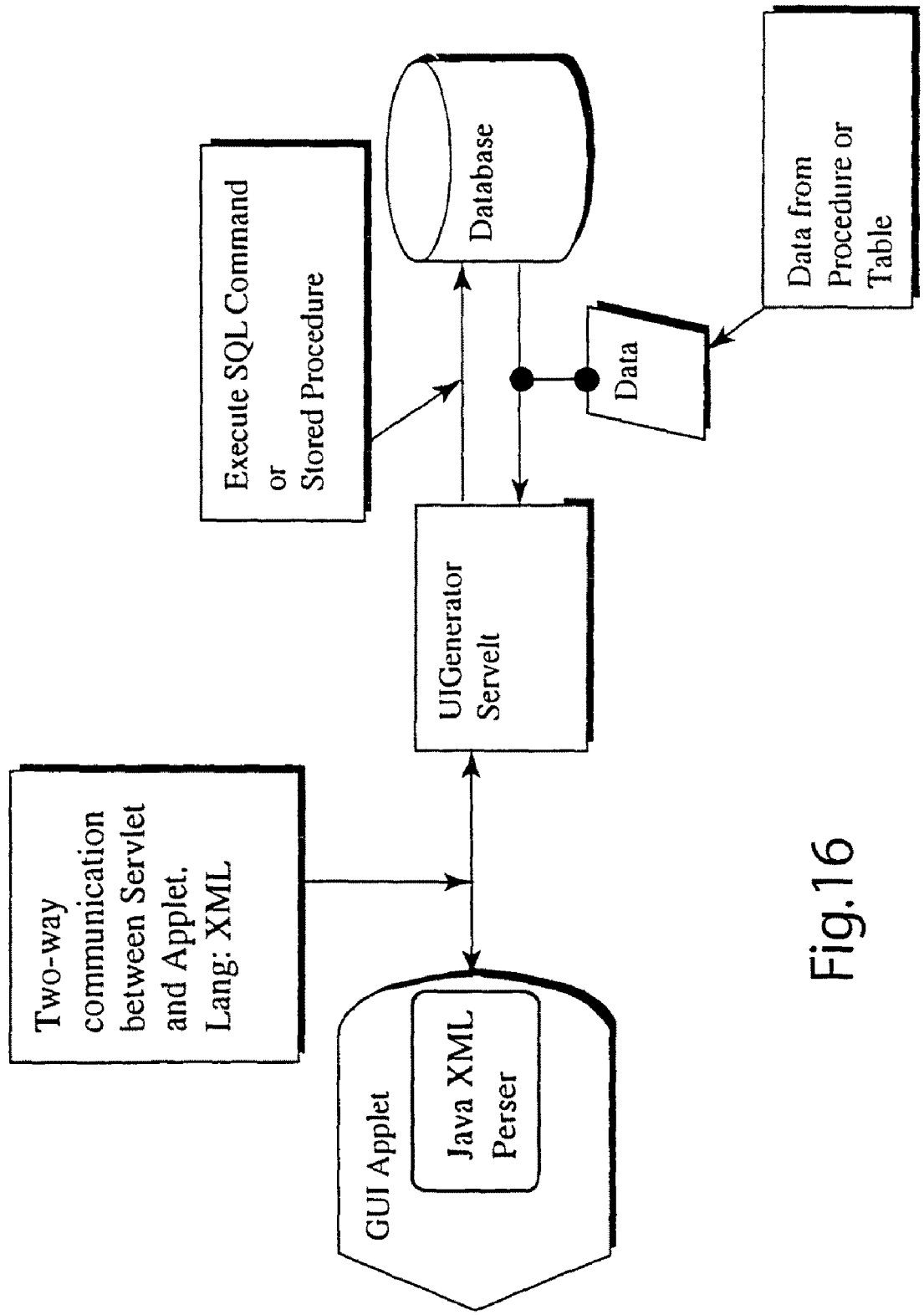
FIG. 16 shows a high level architecture of the GUI generator and GUI applet in accordance with one embodiment of the instant invention.
Figure 17A:
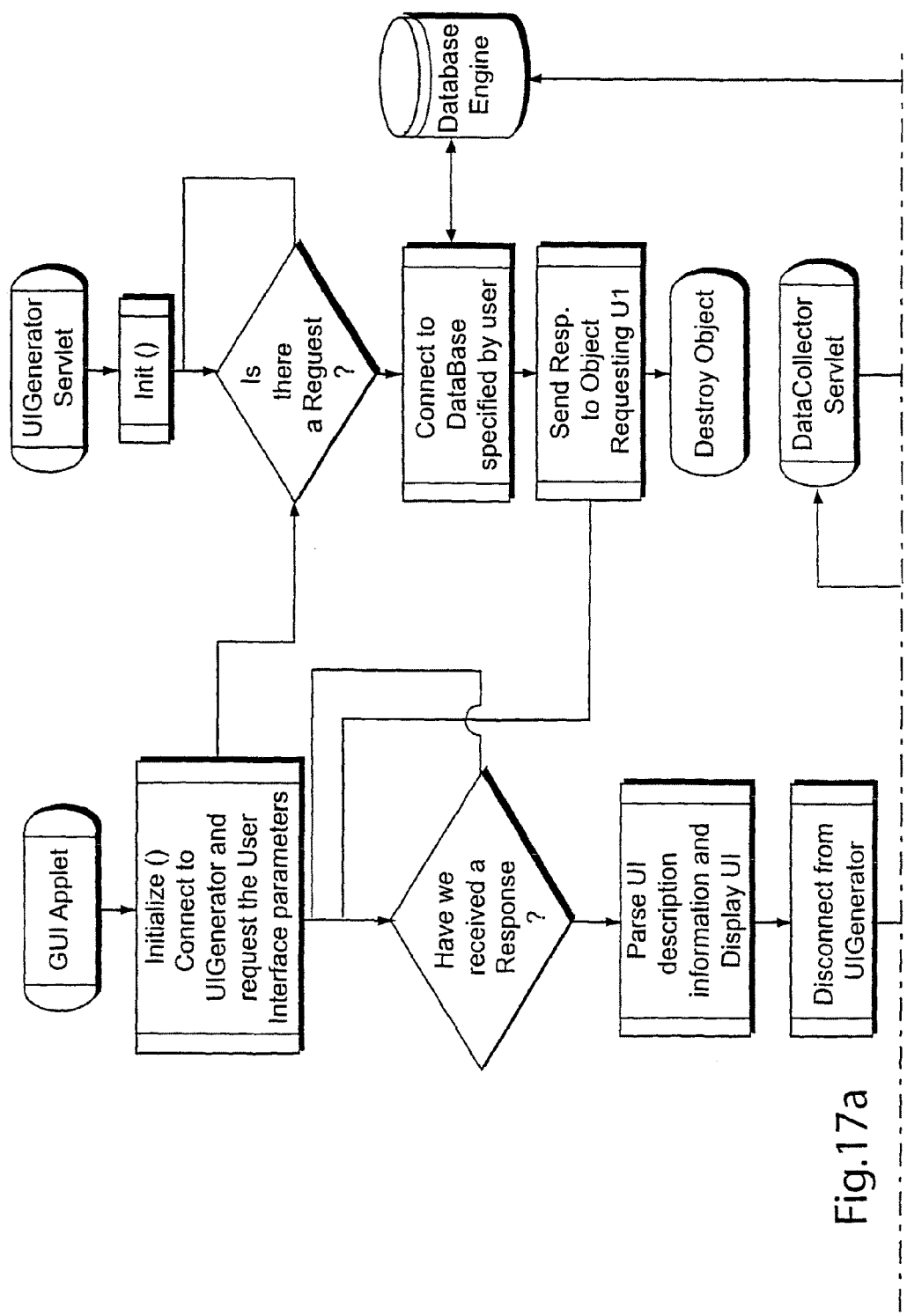
FIG. 17 shows an overall flow chart of the operation of the GUI generator and GUI applet in accordance with one embodiment of the instant invention.
Figure 17B:
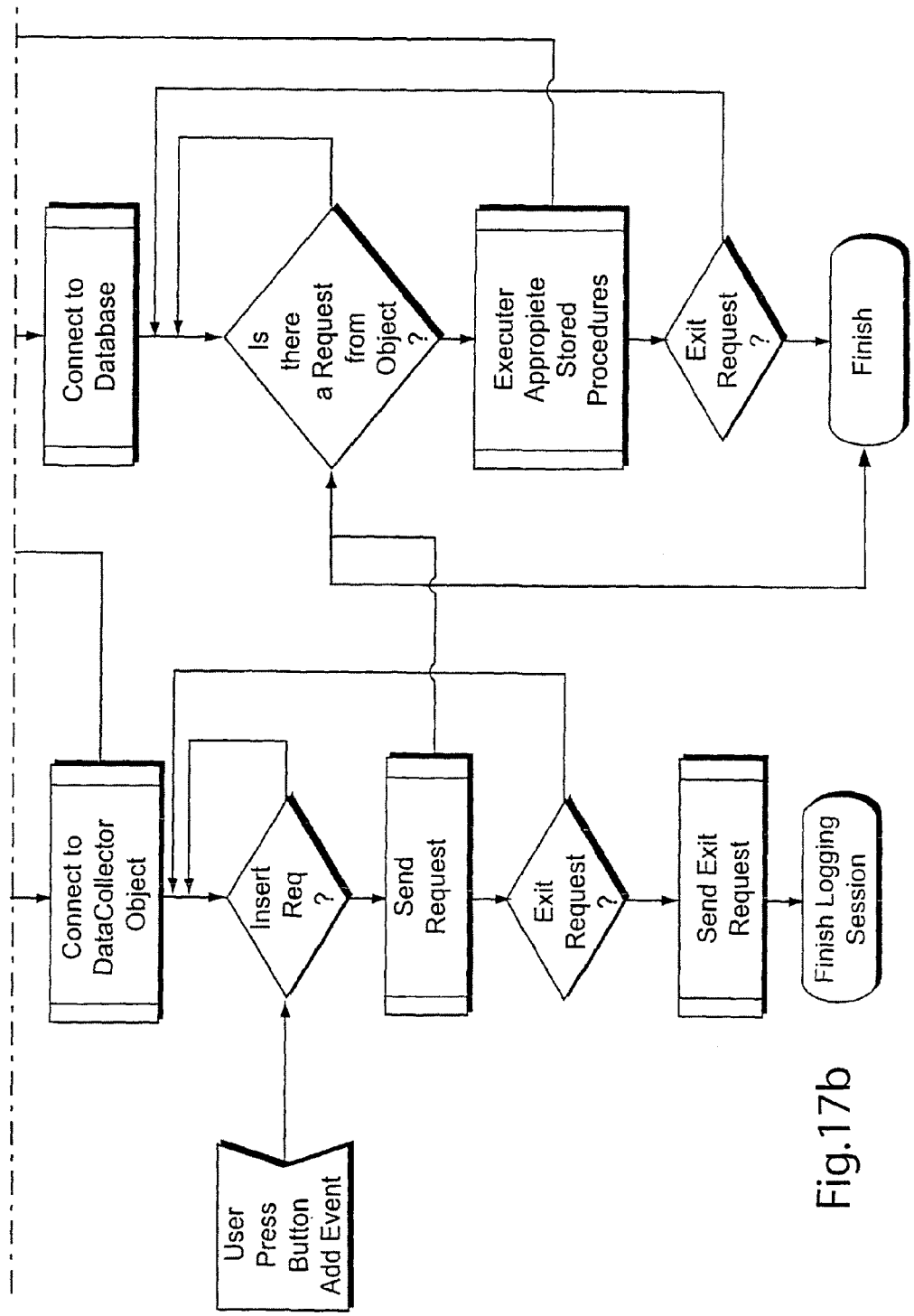

FIG. 16 shows a high level architecture of the components of this aspect of the system. FIG. 17 shows an overall flow diagram of this GUI generator feature.

While the use of a GUI applet has been described above, this user interface generator feature may alternatively be implemented with the use of a standard Web browser. In this alternative embodiment, the browser communicates with the servlet, i.e. a session is established between the browser and the servlet.

Example Basketball Implementation

FIGS. 18-47 show exemplary screen shots for a basketball implementation of the instant invention. A more complete understanding of the operation of the instant invention is provided by this example.

Figure 18:
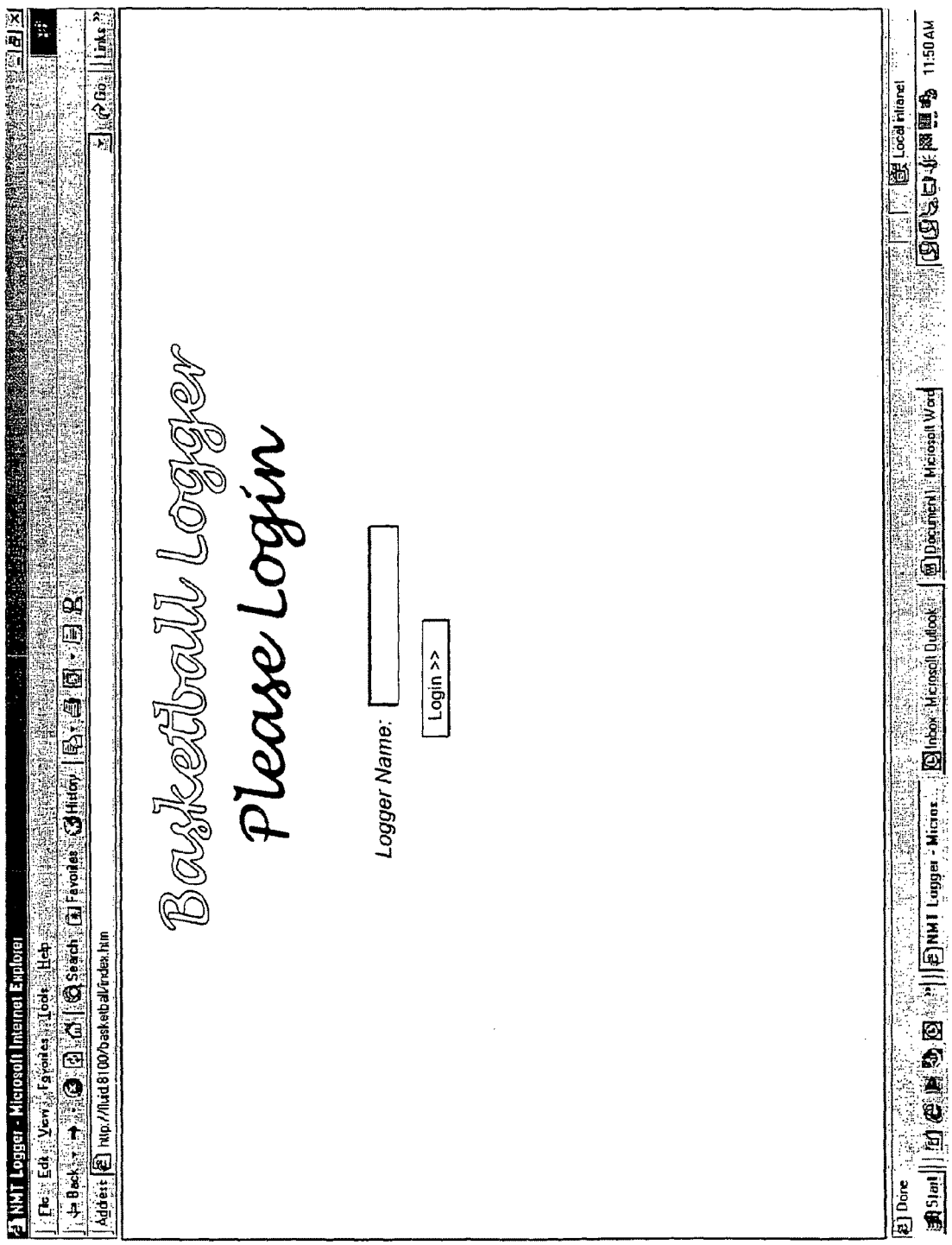

As shown in FIG. 18, to launch the application it is necessary to first "log in". In other words, the application includes certain security features to assure that only authorized persons have access to the system. Thus, the person logging ("the logger") must have access privileges to navigate through the system. To safe guard content, a systems administrator preferably has the sole discretion to permit or disallow an individual access to "their" content or media. The customer determines who shall be the administrator (e.g. a producer, director, associate director, intern, etc.) The administrator will usually grant access to a producer, an assistant director or intern.

Figure 19:
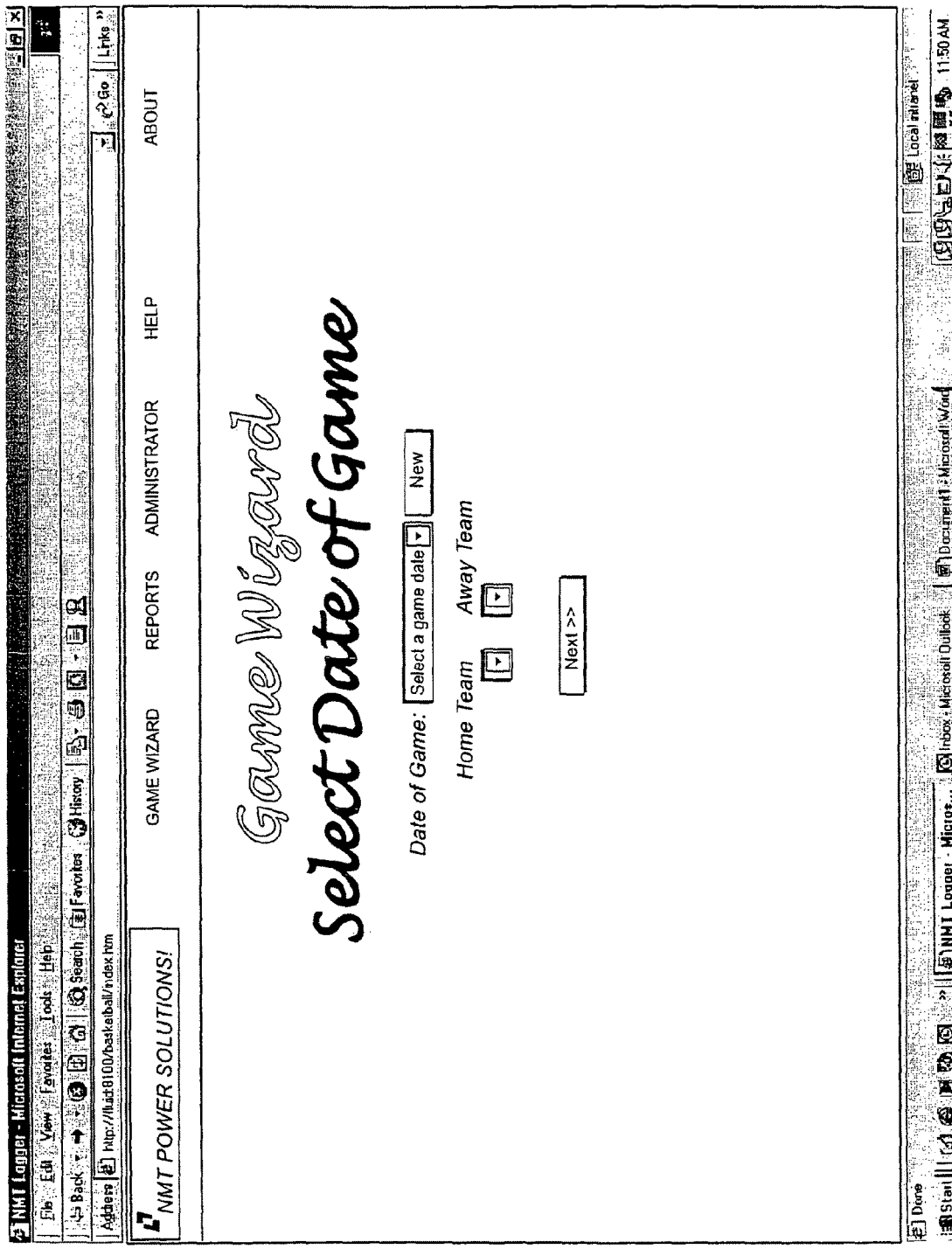

As shown in FIG. 19, when the system administrator has granted access, the "Game Wizard" will appear. At this page the user is able to select a game that has previously logged events (to continue logging a taped game). Or select "New" to log a "live" event (as it occurs in real time).

Figure 20:
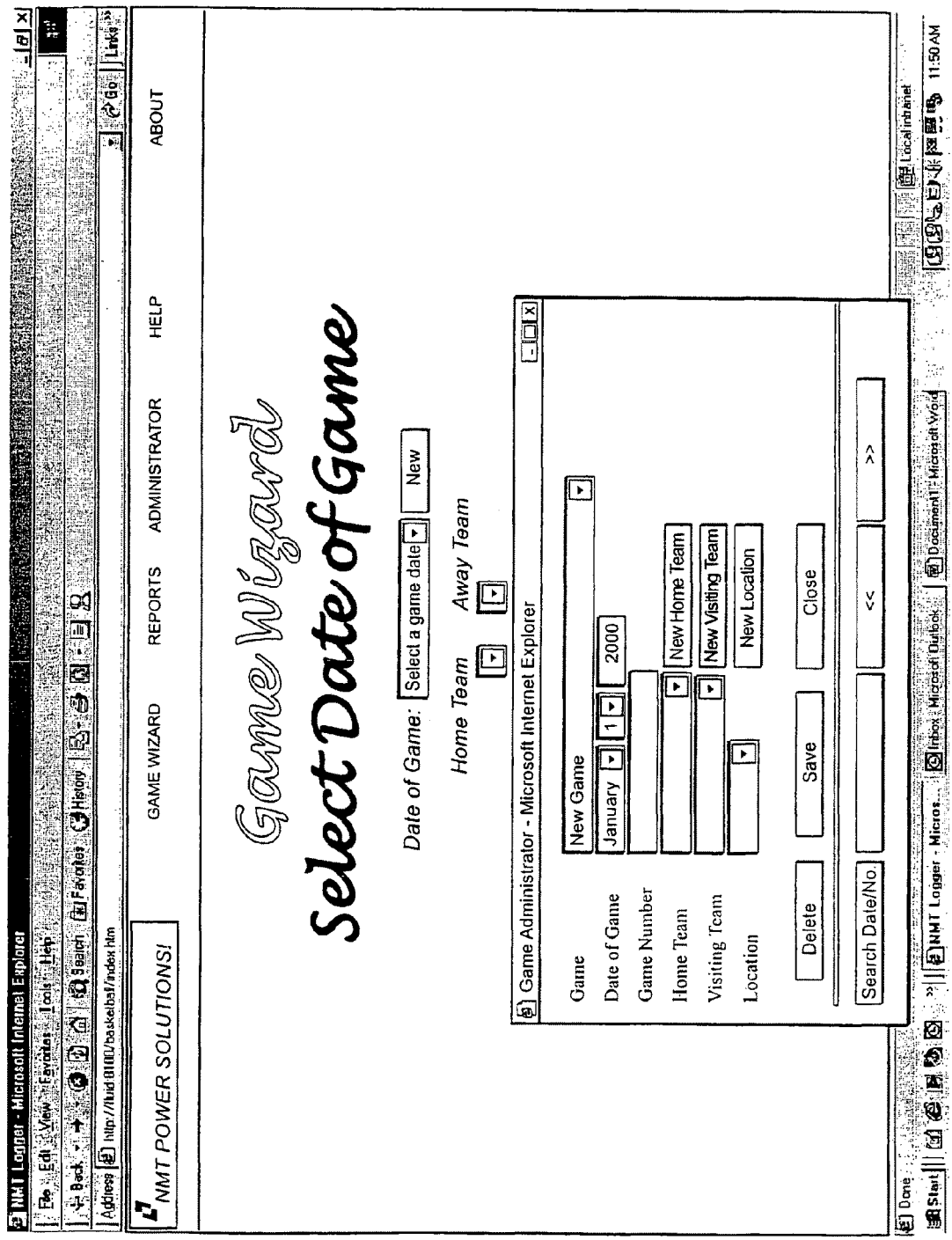

As shown in FIG. 20, if the user chooses to log a "New" or "Live" game, he must enter the information requested in the window. This information is available and based on the team's itinerary. The data for each field is required to assist in the search and retrieval functions of the logging application.

Figure 21:
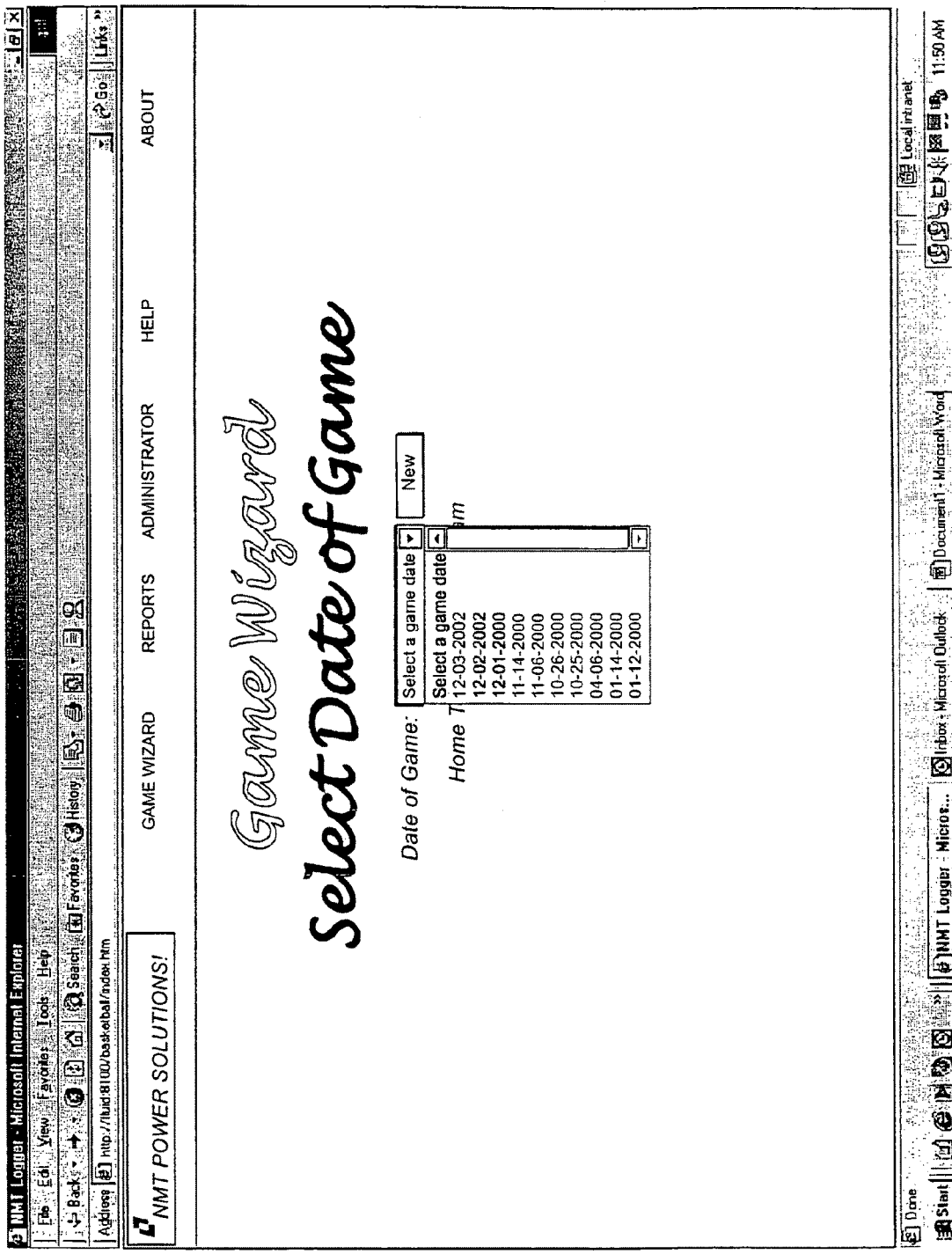
Figure 22:
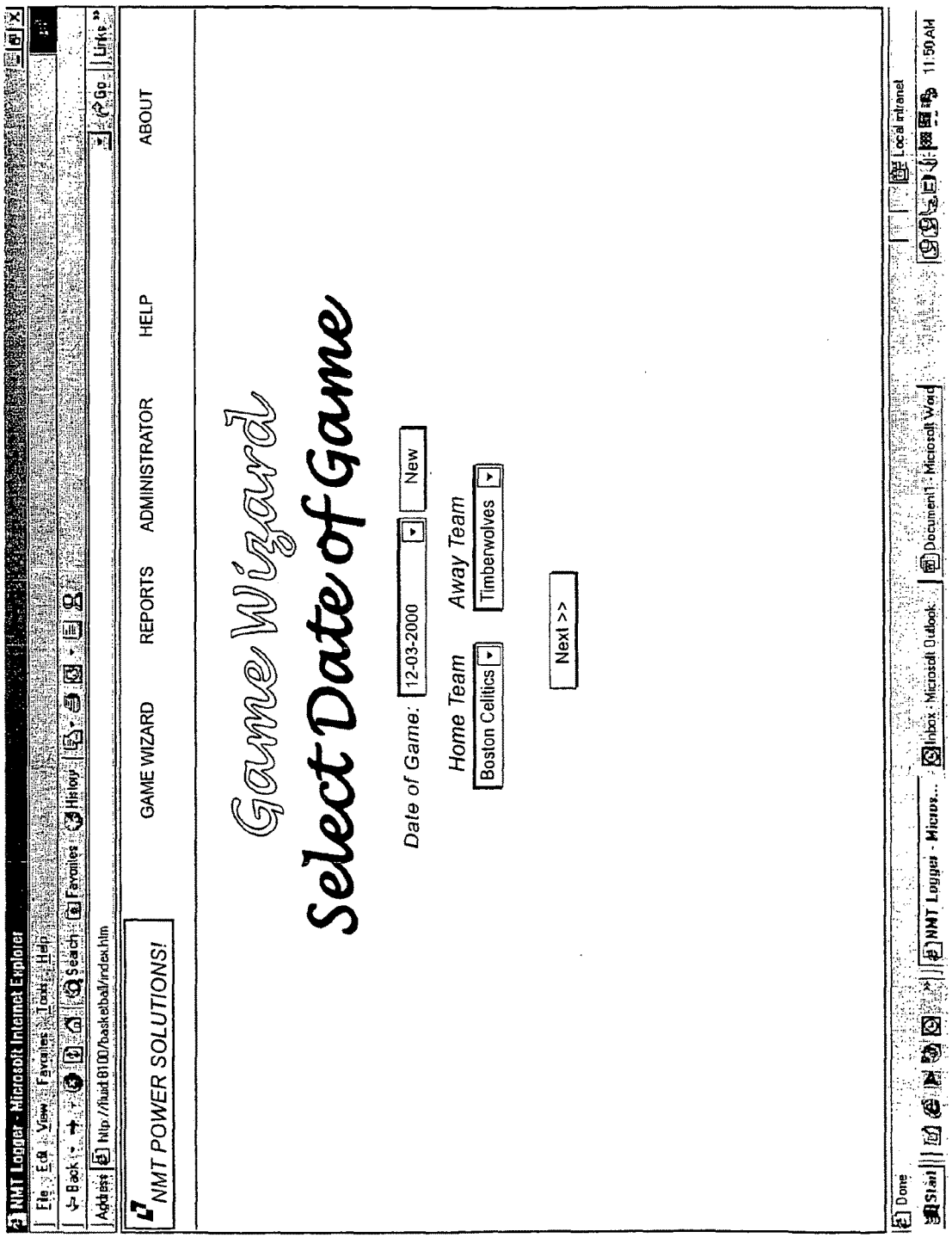

As shown in FIG. 21, if the user desires to resume a previously logged game or event, then he must "Select a game or event date". As shown in FIG. 22, upon "Selecting a game date", the logger can use the pull down menu's to access the "Home and Away Teams", and then click on "next" to proceed.

Figure 23:
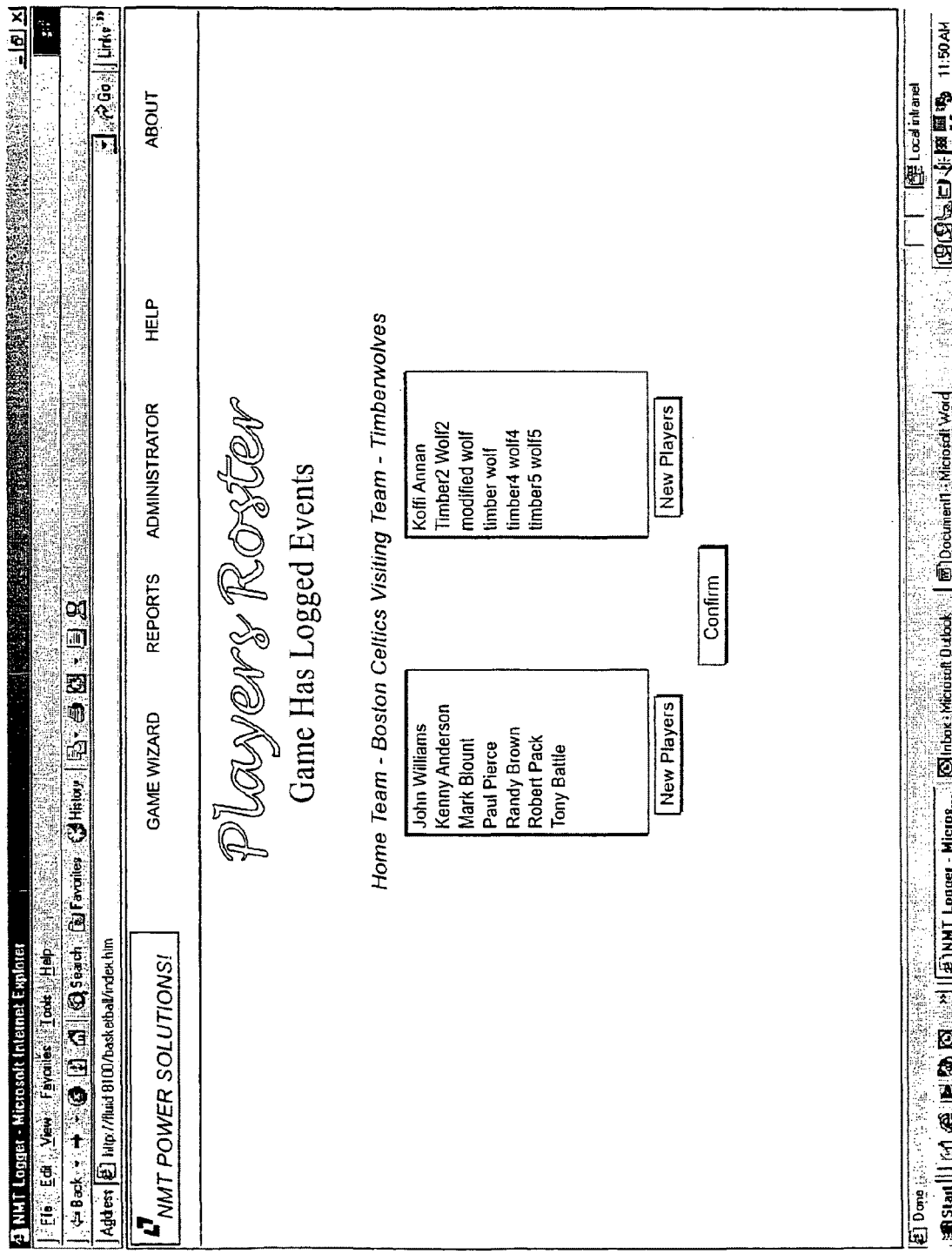

As shown in FIG. 23, after clicking on "Next" on the previous screen, a "Players Roster" will appear and indicate that this "Game Has Logged Events". The user then Selects the players in the active roster. Enter a "New Player", if the player was acquired by draft, trade or any other means by which a player joins a team.

Figure 24:
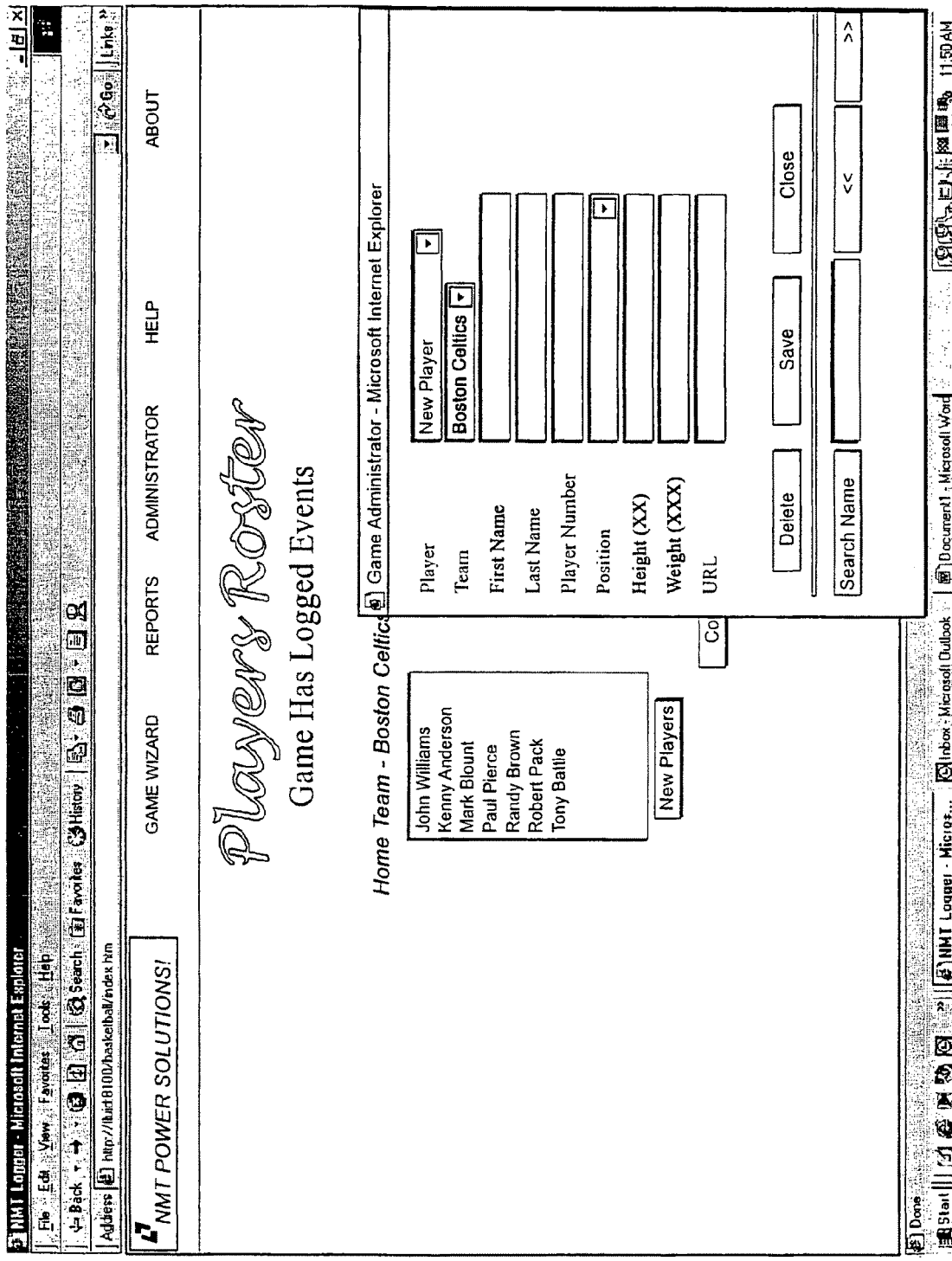

As shown in FIG. 24, if a player is acquired by draft, trade, or other means, the administrator or logger must enter the player's profile: Team, first & last name, player number, position (guard, forward, or center), height, weight, and even web address or e-mail. It is on this page that the logger can delete a preseason player (a player on a 10-day contract), or update a player's weight, etc. A player or person cannot actually be "deleted" but the person or player will be designated as "inactive", if delete is desired. After the persons or players have been traded, drafted, updated or designated "inactive", the user can save and close the players administration window. Then, by clicking on "confirm" the logging page will appear.

Figure 25:
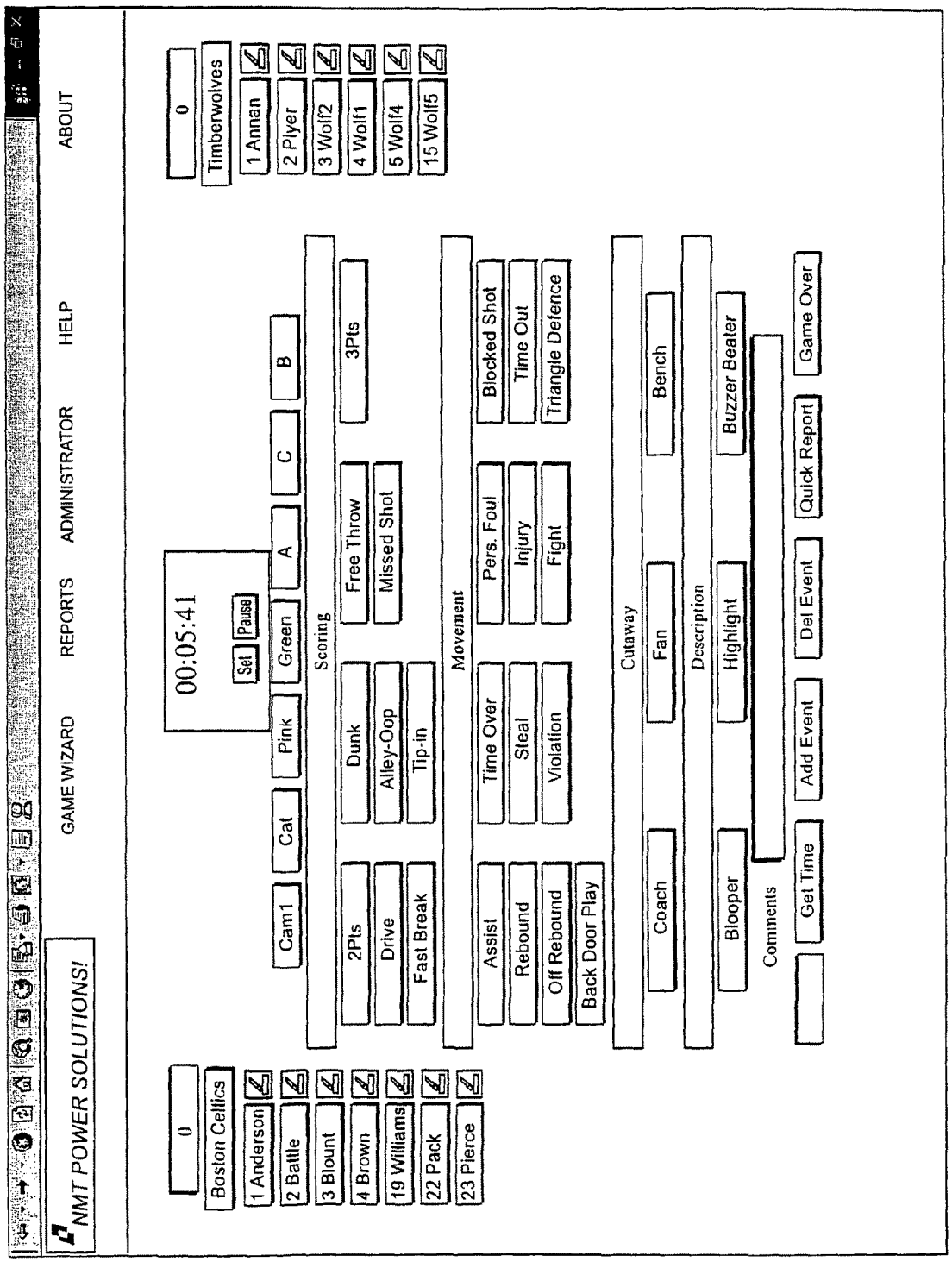

FIG. 25 shows a user interface for the logging of events. This is a main and important screen in accordance with the instant invention, in that it is used for all logging of events by the logger. As explained above, this screen can either be hard coded or automatically generated/customized by the GUI generator. The logging page is where the logger records, indexes, and catalogues any media event. The application includes check-boxes, radio buttons, push buttons, text boxes, circles and/or a touch screen. In accordance with a preferred embodiment of the invention, all of the interface objects on this interface are customizable for the particular application being logged.

Figure 26:
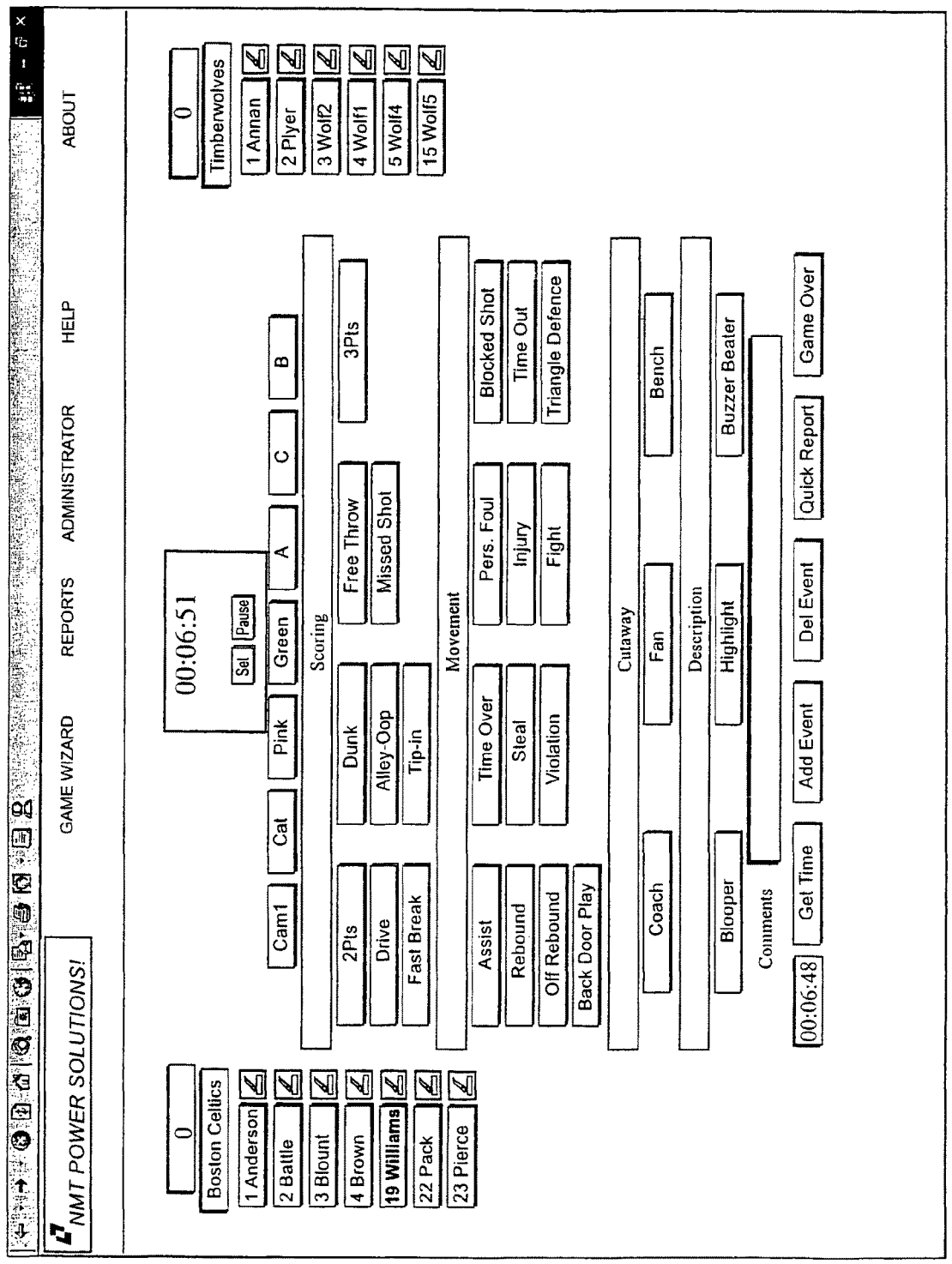

As shown in FIG. 26, if applicable, to begin logging an event, the user selects a person(s), nature of the event (2 point shot), input or "feed" sources (cameras: cat, Pink, Green), and designates whether the particular event was a "highlight", "Blooper", or provides his own category or description. In this basketball example, virtually every possible scenario is covered on the logging application. "Get Time" is designed to jot down or grab the anticipated time of an event or happening while it is developing. If the event developed like the logger anticipated, then he would select "Add Event" to store the selected event in the database. If the logger made an error after "Adding an Event" (e.g. he recorded a 3 point shot and the referee designated it a "2 point shot") he can simply click on "Delete Event" and this will remove only the previously entered event. Getting a report of the logged event is very simple—just click on "Quick Report".

Figure 27:
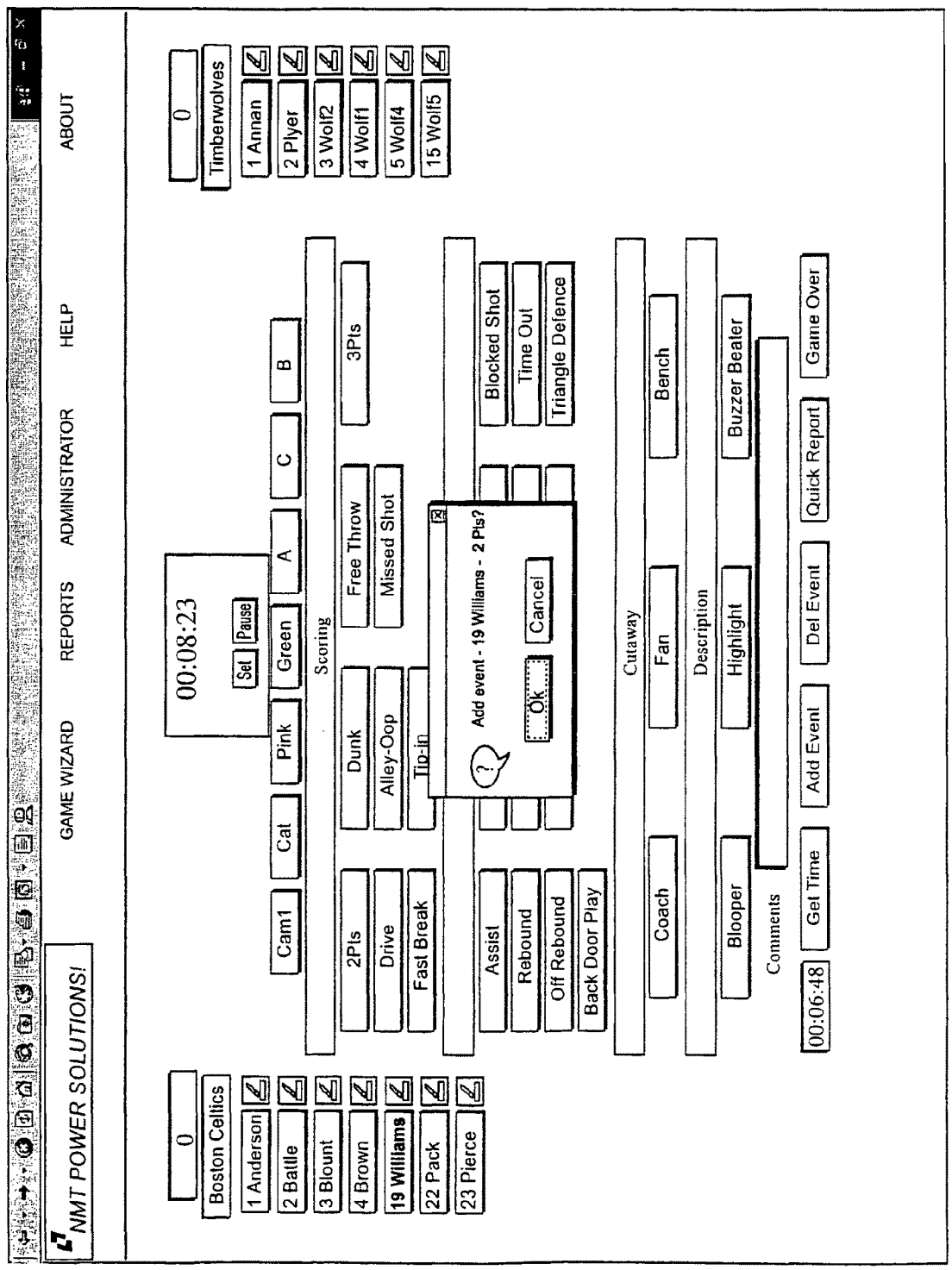

As shown in FIG. 27, after making your selection, the application will ask the logger to confirm the request. This is a safety feature to ensure the accurate inputting of data or events.

As shown in FIG. 28, a "Quick Report" can be selected to give the logger and the production team instant access to shared information across a LAN (local area network) or WAN (wide area network) across the internet.

Figure 29:
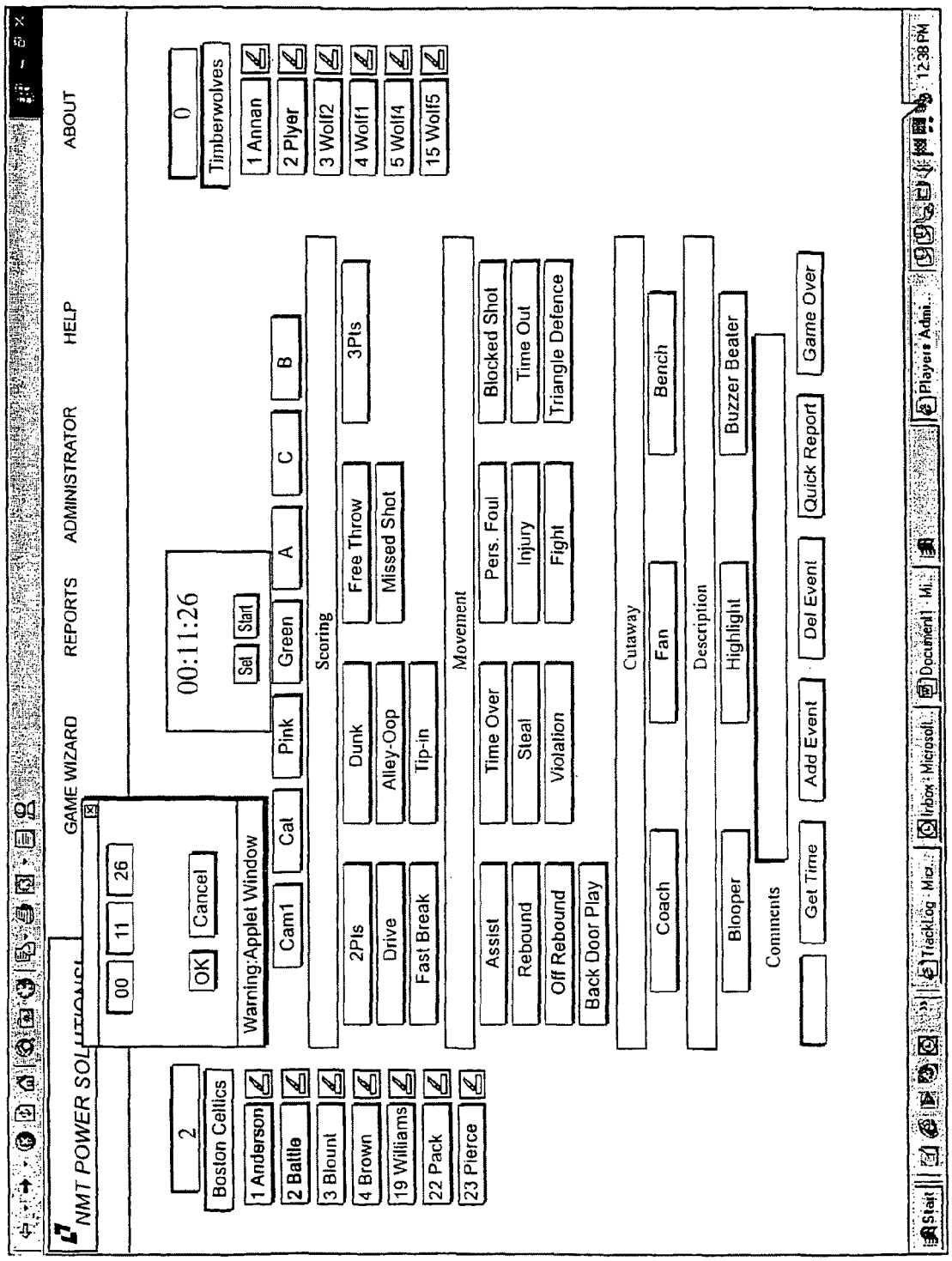

In the content management arena, "content is king" but any type of clock (timecode, military clock, stop-watch, any timezone or any establishing point of reference) is the "life-blood"

of the content. The clock can be "real time or a user defined time". Whatever form it takes in order to retrieve this information universally, this has to be the basis for which events are indexed and retrieved. Setting the clock is as simple as using the application, just point and click. A logger can use a clock format, military time format or whatever format applicable to the user, as seen in FIG. 29.

Figure 30:
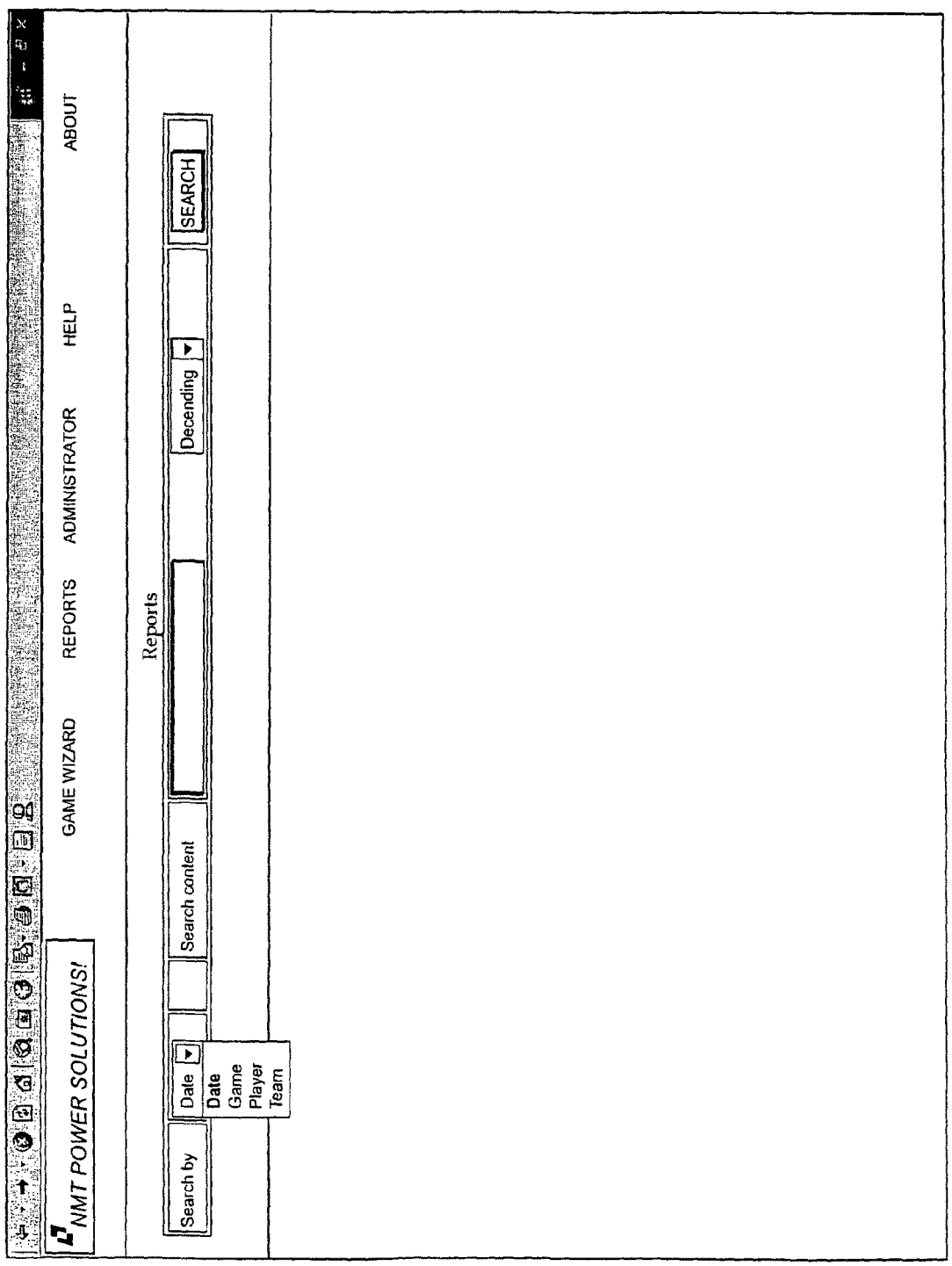

As shown in FIG. 30, at the completion of the event, the logger can point and click on reports to review the event. Reports can be retrieved in several ways: by Date, Game, Player or Team. The reports are intelligent, in that users can pinpoint, search and retrieve specific data (text, audio & video) via specific dates, occurrences (regular or irregular), irrespective of a player's current location, team, status, or history. The data is eternally associated with a person (player), place (city/state/country) or thing (event, occurrence or act).

FIG. 31 shows a report that is the result of a "Player" search. If a person has been entered into the database, the person and his associated events (whether active or inactive) are searchable, retrievable and stored for recollection at a later date.

FIG. 32 shows a report that is the result of a "Player" search—Player: Allan Houston of the NY Knicks. It is an abbreviated version of Allan Houston's events over the course of 4 games. The ability to search is possible by various parameters: Game number, Date, Team events, Game Events or Game comments.

FIG. 33 shows a report that is the result of a "Team" search: the NY Knicks. Searches can be accomplished by game date or by game. Game date will search all the games or events that occurred on that particular date.

The report of FIG. 34 is the result of a "Games" search. This report shows all the games in the database that are available for "Online" on-demand retrieval. The games lists search displays all the games on the database, either in ascending or descending order. Game numbers, game dates, teams, events and comments are all searchable and retrievable. The menu will display all customized fields according to a user's discretion, e.g. medicine, legal, technological or sports. The reports are not limited to sports, but are as diverse as the media management application and it's intelligent indexing and search agents provided by the application.

Figure 35:
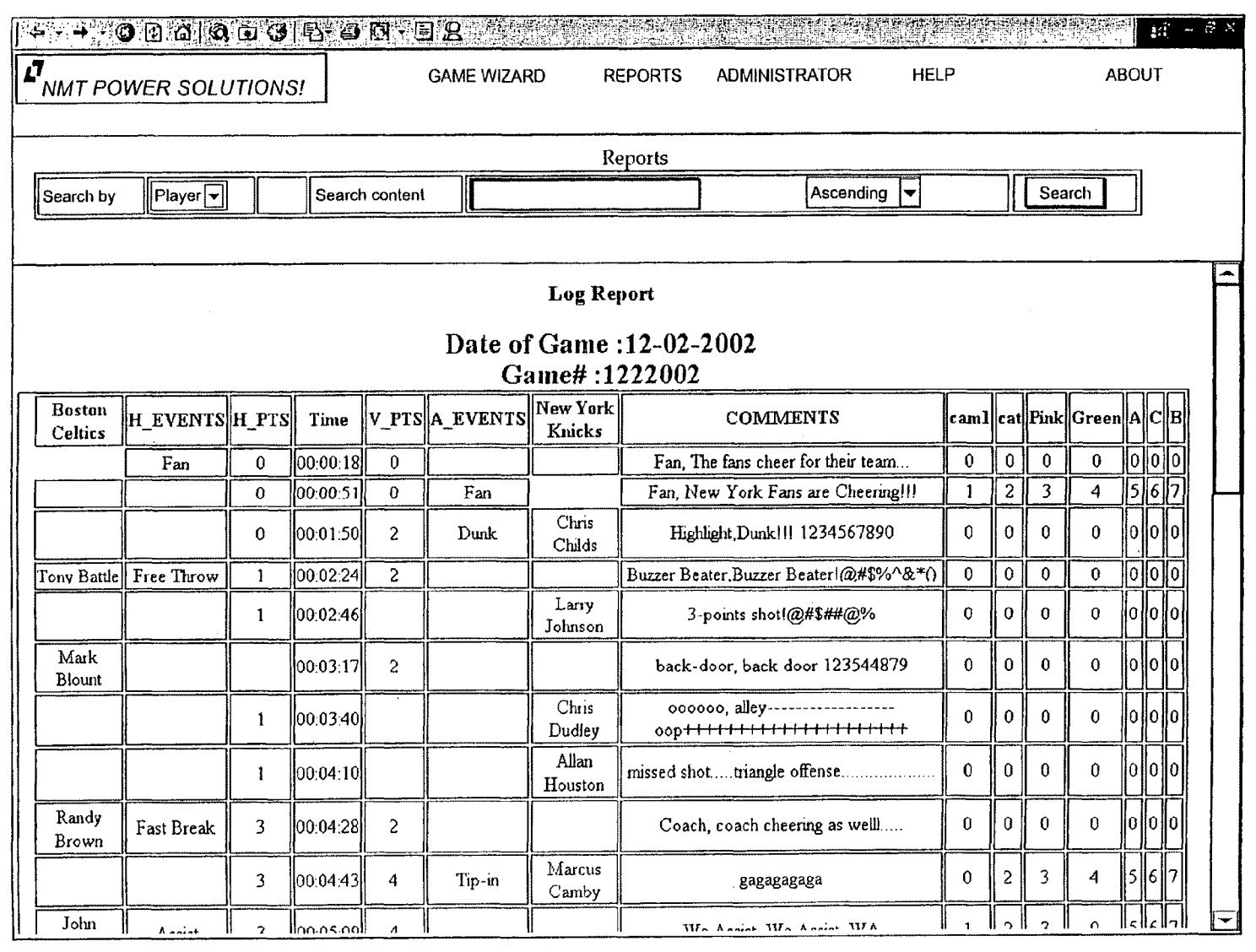

FIG. 35 shows a report that is the result of an "Individual Game" search: between the Boston Celtic and the New York Knicks. The report displays each event logged: the player involved in the event, the type of event or function performed by the player, relative score of the "Home team" for that particular event, the associated timecode, clock, user clock, stop watch or time-zone (as the event occurred), "Visiting team points", visiting team events, visiting team players, a "comments section" for unusual or incidental occurrences that require a detailed explanation of the occurrence, performance or event, and camera angles or input source routing information.

Figure 36:
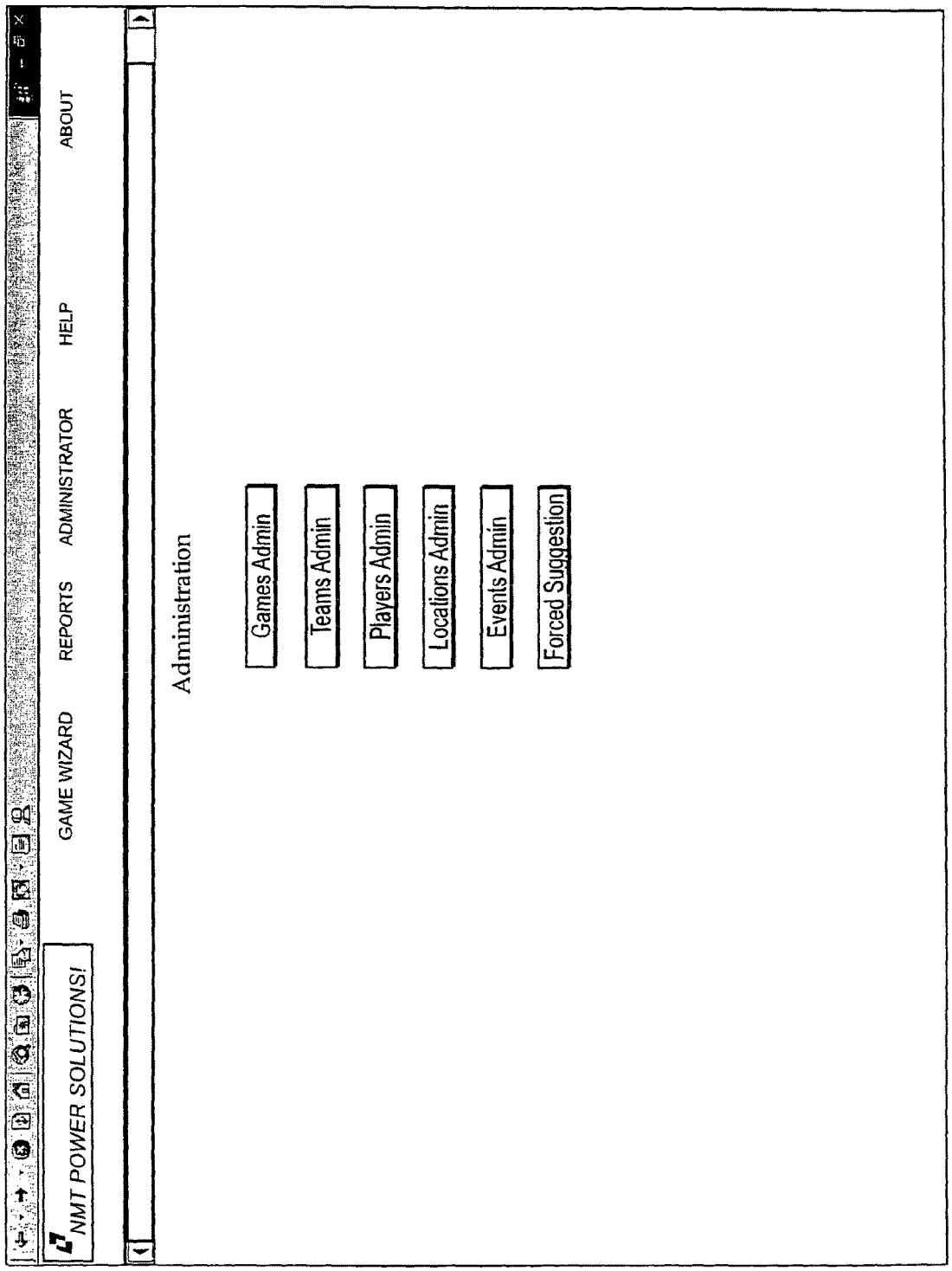

FIG. 36 shows the system administration menu and consists of items that define the database and logging features. Such features include: Games Admin., Teams Admin., Players Admin., Locations Admin., Events Admin., and Forced Suggestion.

Figure 37:
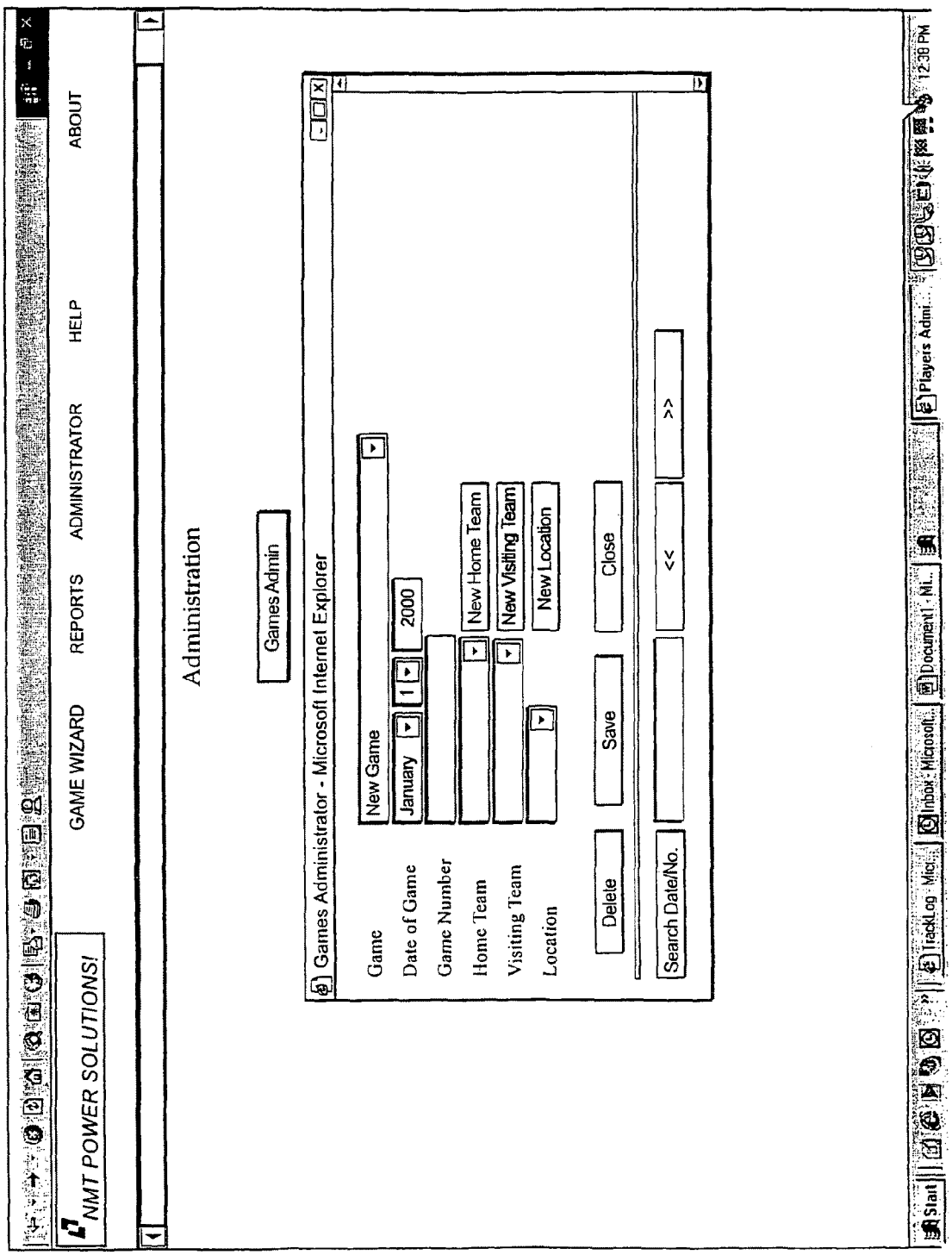

As shown in FIG. 37, Games Administration, is where an administrator or logger enters the itinerary of the desired team(s). This information is linked to past and future information, for instant updates and historical data, by which users can access (via a link or download) Game information, such as previous games and long standing rivalry's.

Figure 38:
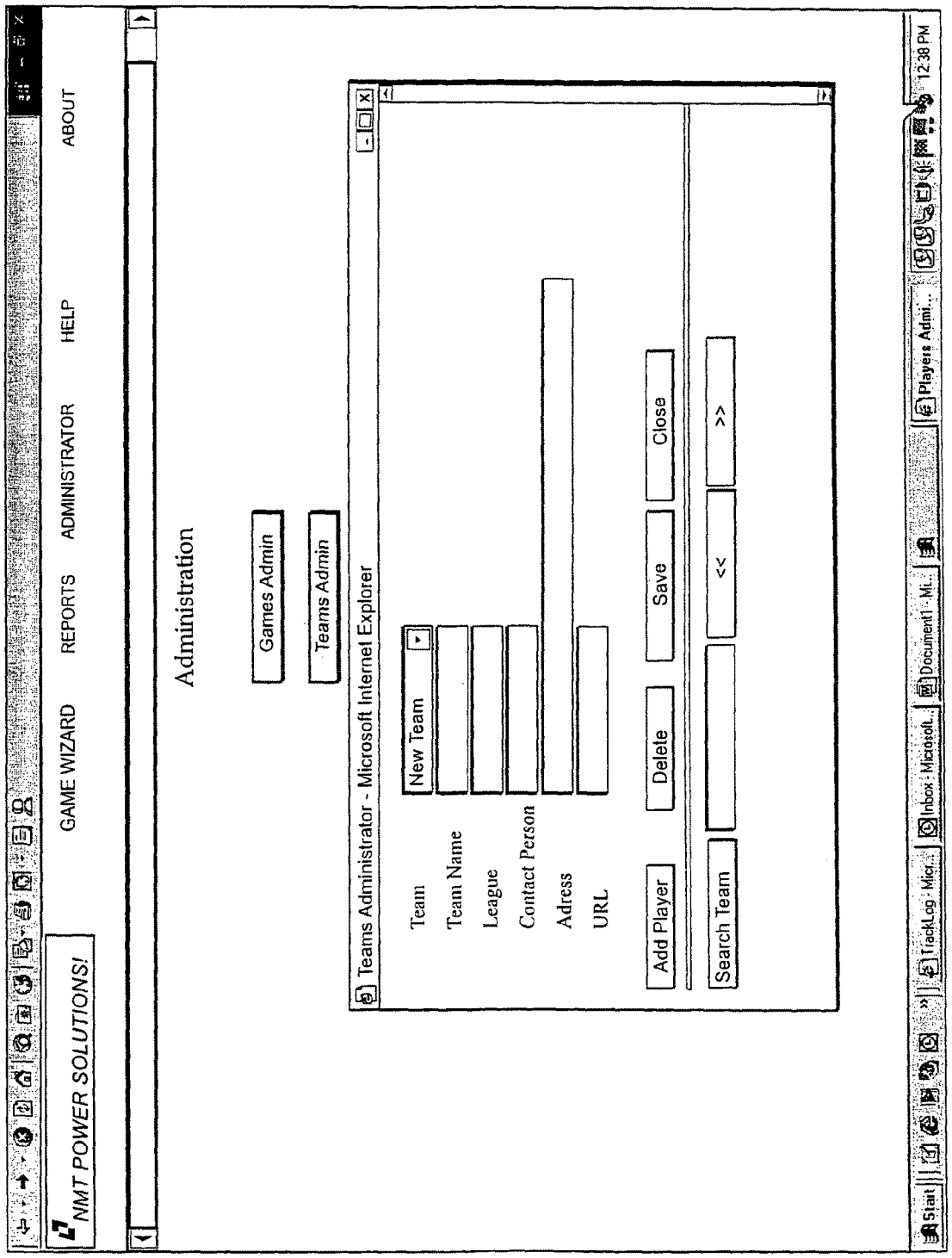

As shown in FIG. 38, Teams Administration, is where an administrator or logger enters the team profile. E.g. Team name: New York Knicks/League: NBA/Contact Person: David Stern/Address: 2 Pennsylvania Plaza, NY, N.Y. 10010/ URL: www.nyknicks.com. It is noted that the "real estate" on any screen is available for: Title sponsors, Advertisements, segmented information for the purpose of Tourism, Sports bars, Restaurants, and Hotels.

Figure 39:
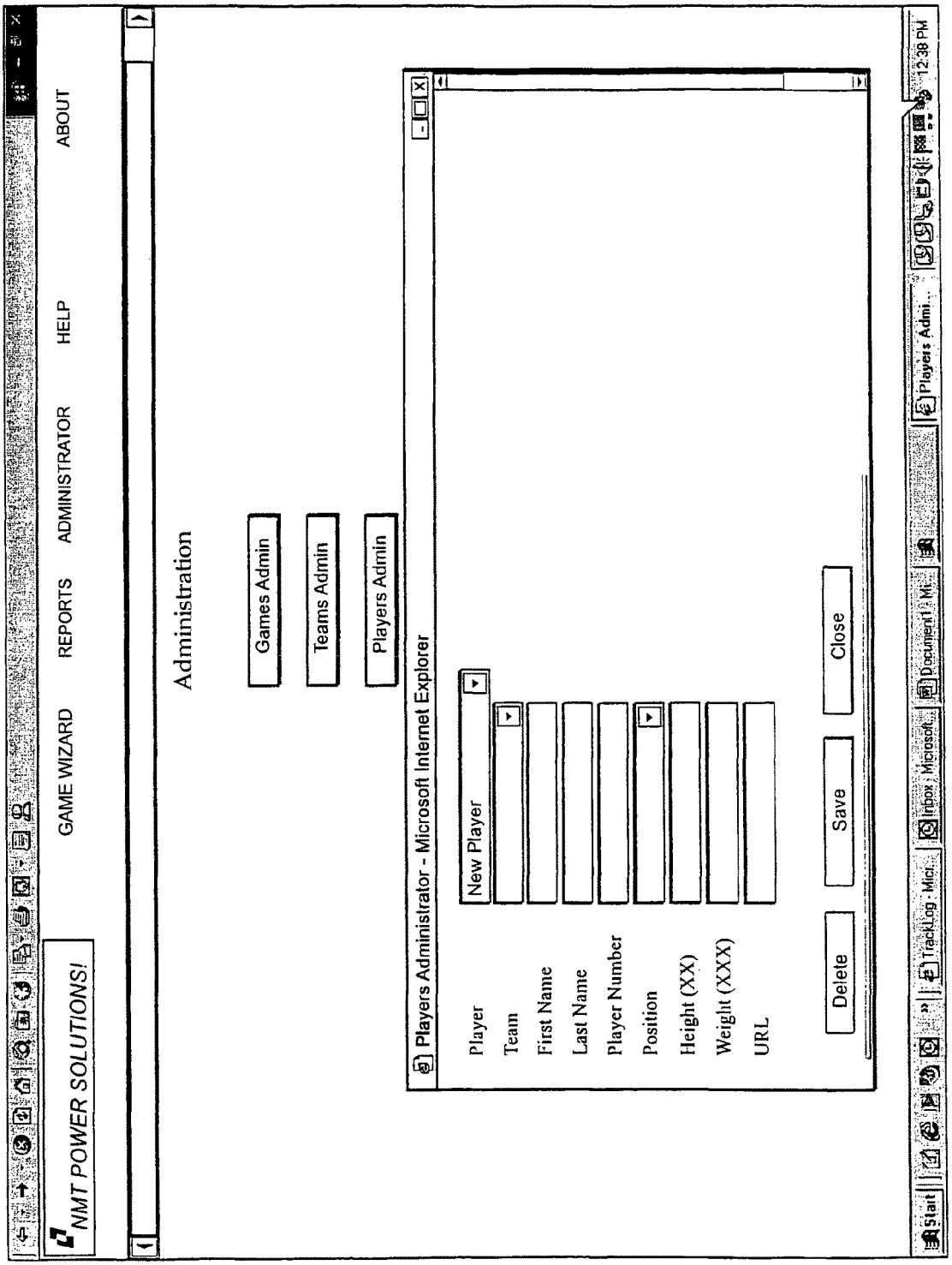

As shown in FIG. 39, Players Administration, is where an administrator or logger enters the players profile. Eg. Team name: Los Angeles Lakers/First name: Shaquille/Last name: O'Neal/Player number: 34/Position: Center/Height: 7-3/ Weight: 305/URL: www.Dunk.net. The URL (Uniform Resource Locator) provide links to player's web sites and can update and retrieve personal web site links, associated press int'l headlines, up to the minutes stats and virtually any internet accessible information globally available.

Figure 40:
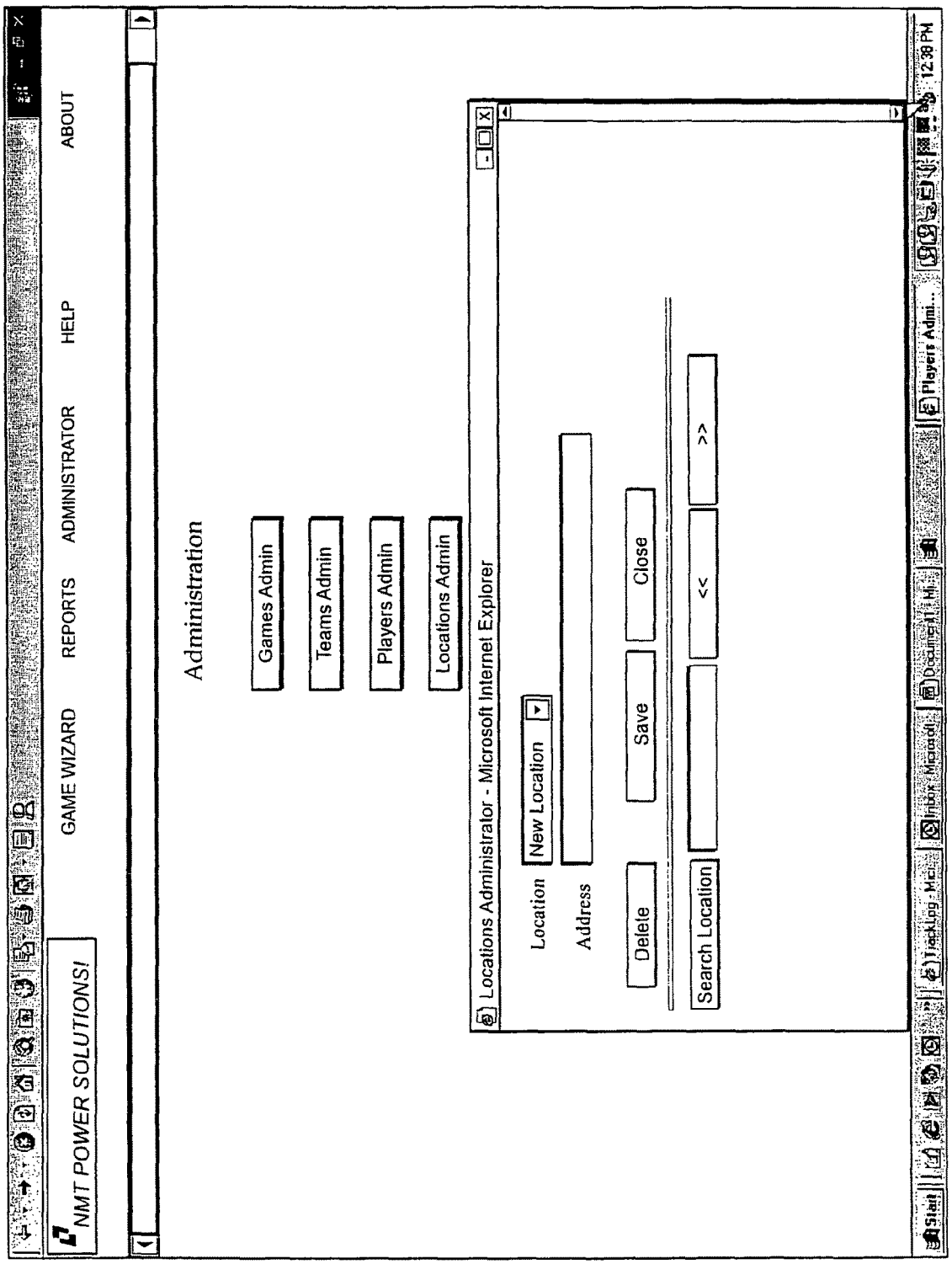

As shown in FIG. 40, Location Administration is where an administrator or logger enters the cities/locations that host a NBA team.

Figure 41:
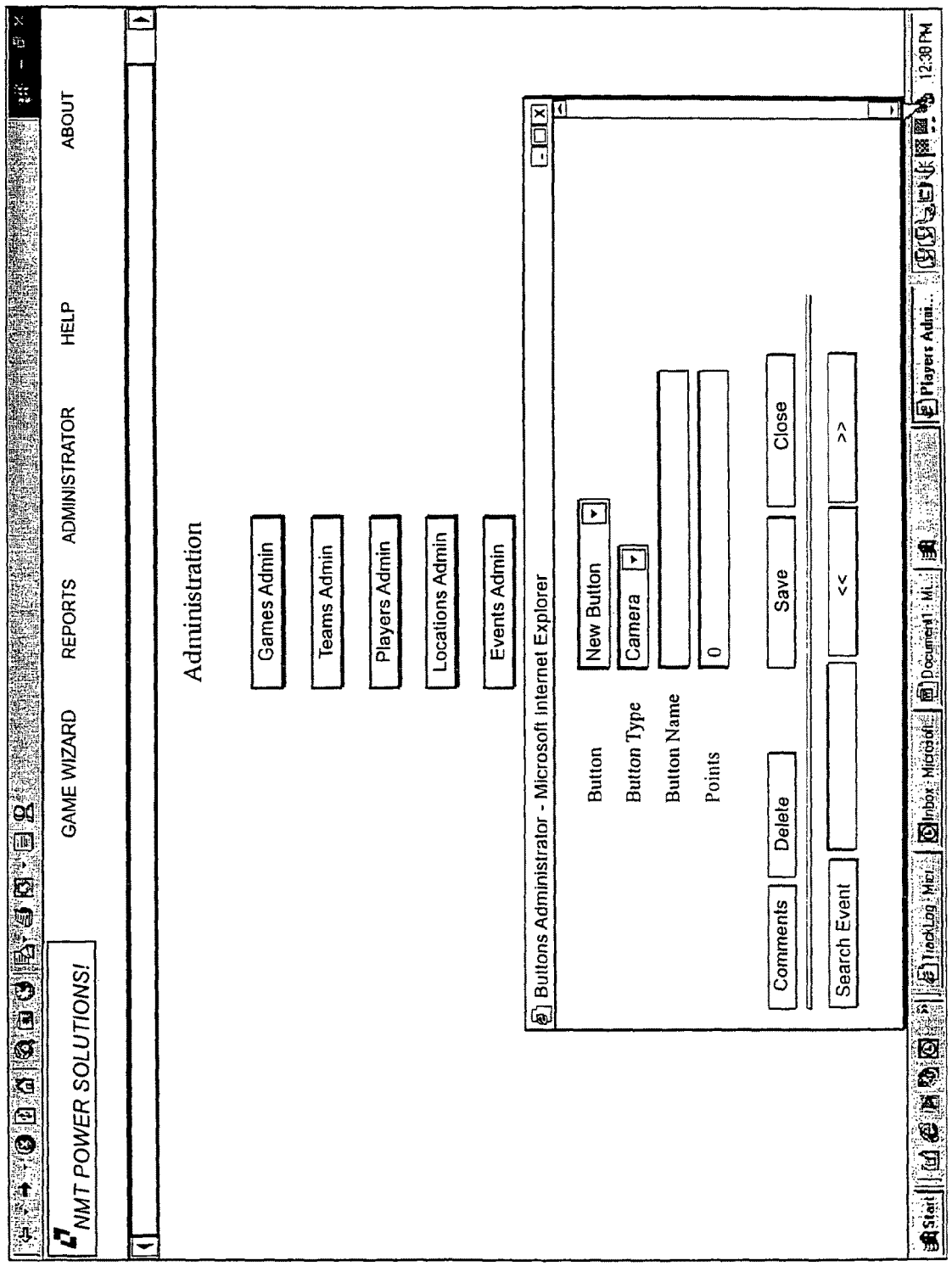

As shown in FIG. 41, Events Administration permits the administrator or logger to customize the logging application with their own special terminology. For example: the button "2 pt. Shot" can be changed to "jumper". Or "dunk" can be customized to say "Jam!" Preferably, every item on the application is totally customizable, allowing the user total freedom to record a sporting event, fashion show, courtroom proceeding, or any desired A/V event.

Figure 42:
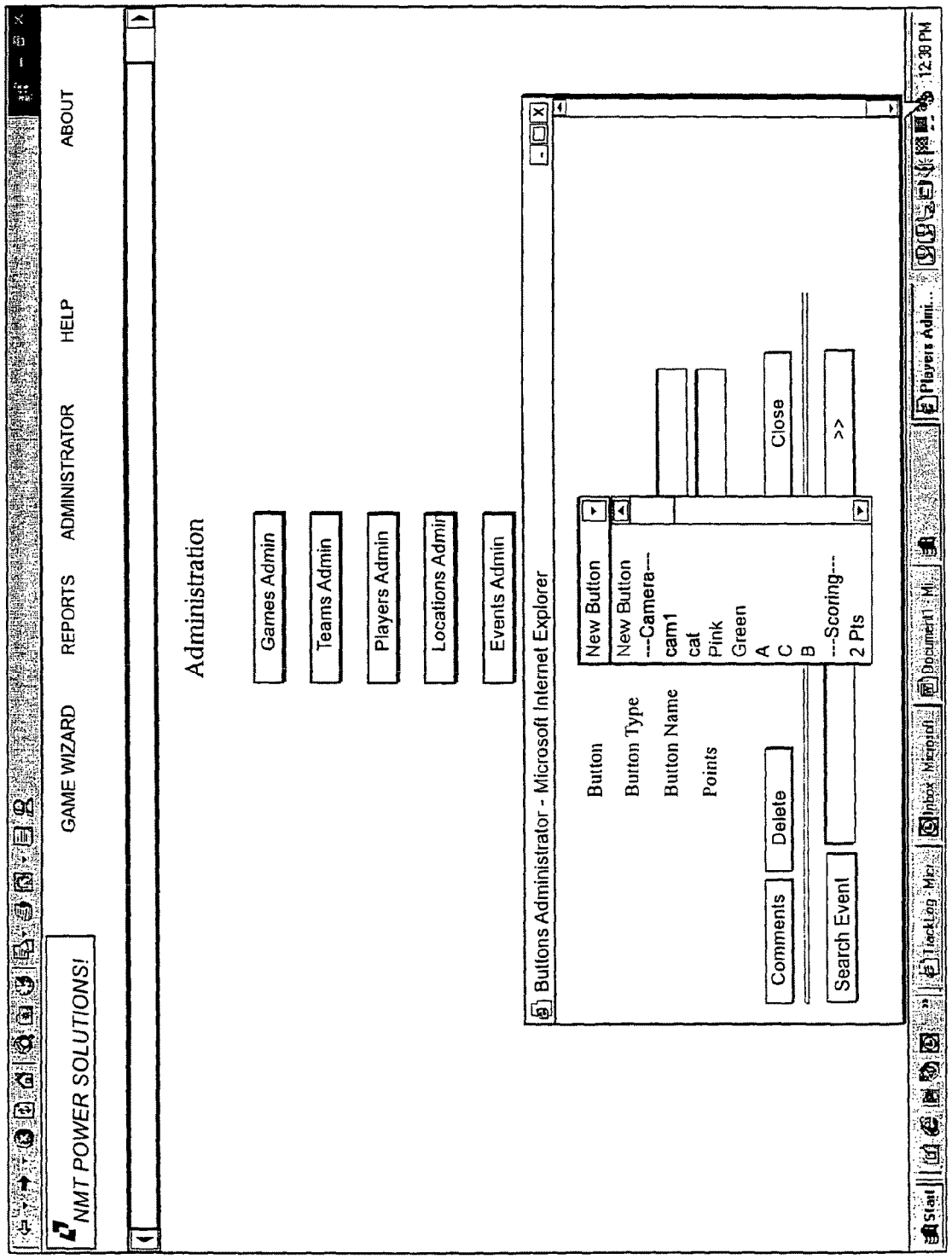

As shown in FIGS. 41 and 42, Events Administration permits the administrator or logger to customize the logging application with their own special terminology. For example: the button "2 pt. Shot" can be changed to "jumper". Or "dunk" can be customized to say "Jam!" Every item on the application is totally customizable, allowing the user total freedom to record a sporting event, fashion show, courtroom proceeding, or any A/V event.

Figure 43:
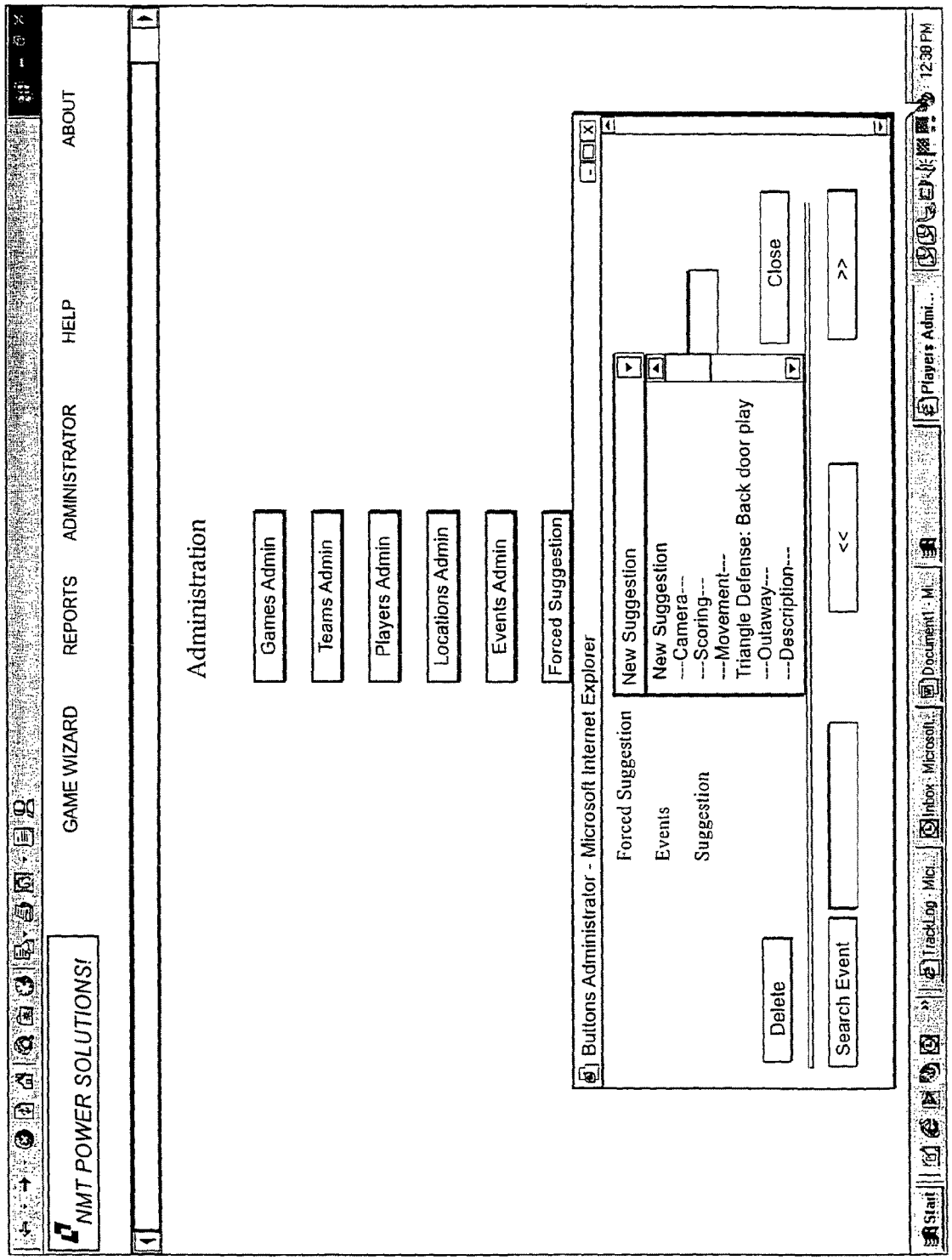

FIG. 43 demonstrates a "Forced Suggestion" feature of the instant invention. This is the selection process for designating which buttons or boxes will have the "Forced Suggestion" feature. "Forced Suggestion" is a feature that prompts the end user to go beyond the basic description of an event. A user can record an event such as a fashion show or court proceeding and while indexing the typical events, the user can program certain sequences of clicks to ask further question to the logger, e.g. "Is the subject smiling? Sad? Furious? Or what is the climate of the courtroom?" This way of logging compels the user to be more specific in the task at hand.

Figure 44:
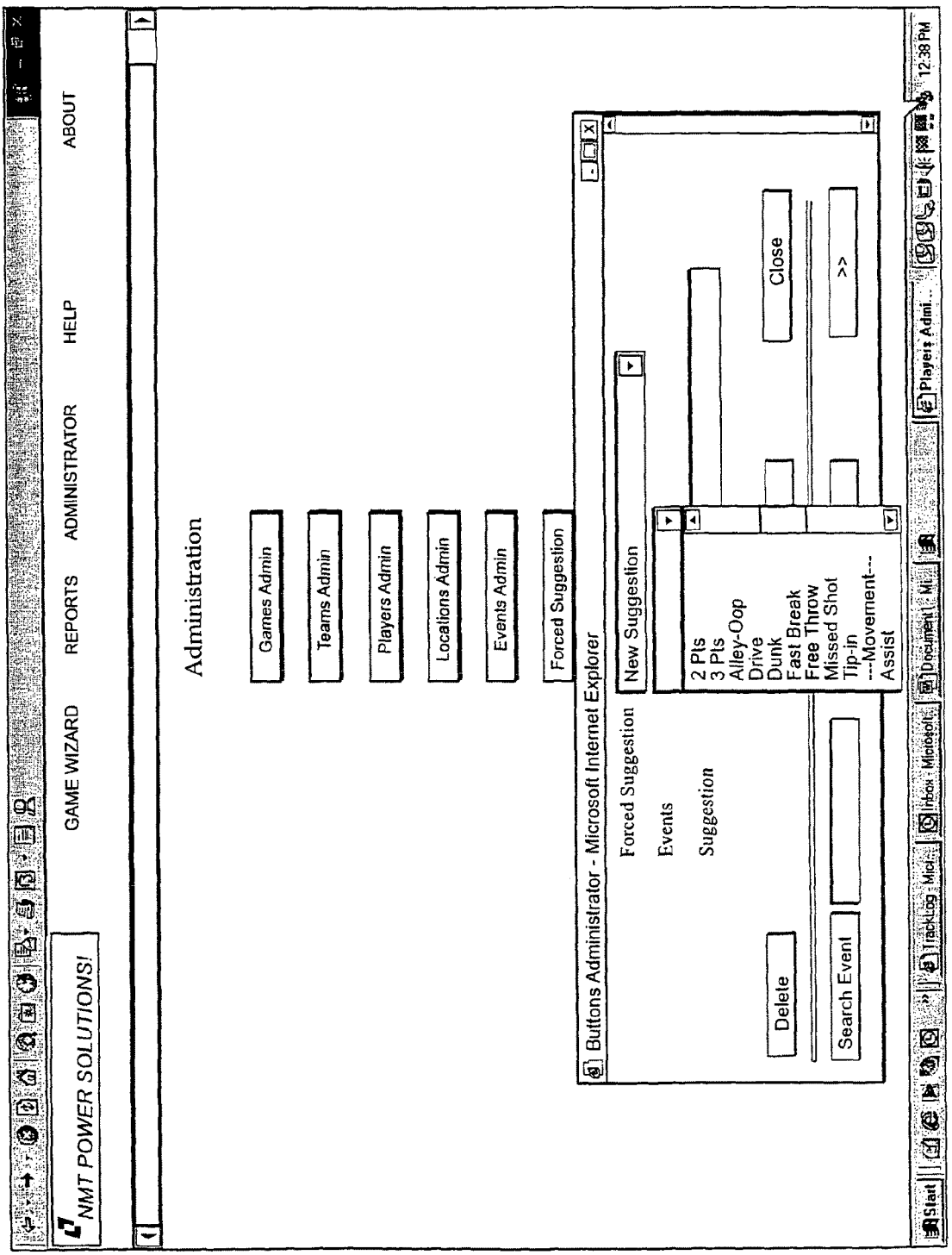

As seen in FIG. 44, Forced Suggestion is a feature that "reminds" the logger to complete additional steps based on the predetermined buttons that the administrator designates. For example: If a player dunks a shot over an opponent, did the player react after the dunk? Did he raise his fists in victory? Did he celebrate? These are forced suggestions, which makes the logger submit more details on a particular event.

Figure 46:
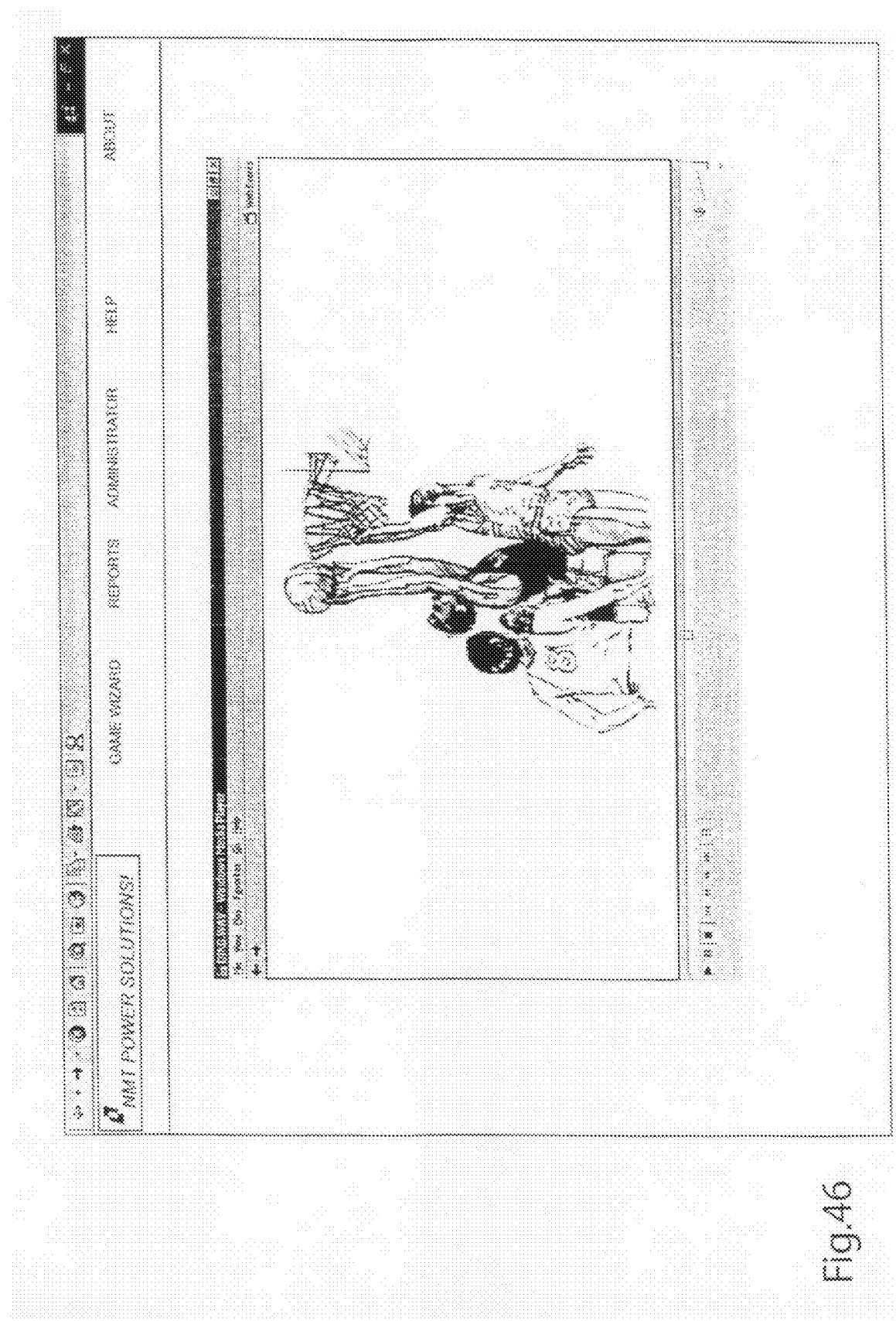

FIG. 45 shows an exemplary "Clips" feature of the invention in connection with a logged hockey game. Any of the listed events in FIG. 45 can be clicked-on to see the actual video segment of the event. In addition, the system enables the concatenation of multiple selected media segments into a single media (e.g., video) stream, if desired. Thus, in accordance with the invention, a user can easily search for, retrieve and view captured video segments after they have been logged. FIG. 46 illustrates a video segment being shown in response to clicking on an event listed on FIG. 45.

As can be seen from the above description, the invention provides a media content management system that significantly improves logging operations, as well as provides a sophisticated search and retrieval system for media assets. The system can be used in a variety of applications and by various people for various reasons within each application. For example, during a sporting event, numerous loggers could be using the system in a networked embodiment. Each of the loggers could have a customized interface to suit their specific logging task. All of the logged events, and optionally the associated media segments, can then be stored to a database for later search, retrieval and viewing by anyone with authorized access to the system. In this manner, media assets can be easily and efficiently managed.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A media logging system for indexing media, comprising:
   a timer object configured to provide a time reference upon request in connection with the media; and
   a plurality of logger objects configured to enable a plurality of respective users to log predefined events that occur in the media by associating the events with respective time reference from the timer object,
   the media logging system being located in a networked environment so that the users have access thereto using respective user interfaces.

2. The logging system of claim 1, wherein the logger objects include graphical user interfaces having a plurality of interface objects selectable by a user of the logging system in order to log events that occur in the media.

3. The logging system of claim 2, wherein the interface objects include labels thereon corresponding to predetermined events that may typically occur in the particular media being logged.

4. The logging system of claim 2, wherein the logging system is configured to enable a sporting event to be logged, the interface objects corresponding to events that occur during the sporting event.

5. The logging system of claim 2, wherein the logger objects include user-selectable elements enabling the users to create new fields in a logging database for logging custom data associated in the media.

6. The logging system of claim 1, wherein the user interfaces are customizable to correspond to types of events that occur in the particular media being logged.

7. The logging system of claim 1, wherein the system includes an arrangement that automatically logs predefined events in the media being logged based on video analysis.

8. The logging system of claim 1, wherein the system includes an arrangement that automatically logs predefined events based on text analysis.

9. The logging system of claim 1, wherein the system includes an arrangement that automatically logs predefined events based on audio analysis.

10. The logging system of claim 1, wherein the system includes a video server that captures logged events and digitally stores the captured events as media segments.

11. The logging system of claim 10, wherein the user interfaces include a feature that enables the media segments to be selectively retrieved and viewed.

12. The logging system of claim 11, wherein the feature includes a search engine that enables logged events to be searched using various search parameters.

13. The logging system of claim 1, wherein the user interfaces respectively provided to the users are individually customized to suit a logging task of the respective user.

14. A media asset management system for managing media assets, comprising:
   a logging application that creates indexes of events that occur in the media, the logging application including a graphical user interface configured to enable a user to (a) select predefined events that occur in the media to be indexed, and (b) define new events that occur in the media to be indexed on the fly;
   a video server that captures and digitally stores events logged by the logging application as media segments; and
   a search and retrieval engine that enables the media segments to be located and retrieved based on the indexes,
   the media asset management system being located in a networked environment so that a plurality of users have access thereto using respective logging application user interfaces.

15. The media asset management system of claim 14, wherein each said graphical user interface includes interface objects having labels thereon corresponding to predefined events that typically occur in the particular media being logged by the logging application.

16. The media asset management system of claim 15, wherein the logging application is adapted for use in logging a sporting event and the interface objects correspond to events that occur during the sporting event.

17. The media asset management system of claim 14, wherein the video server includes an arrangement that automatically logs predefined events based on video analysis.

18. The media asset management system of claim 14, herein the video server includes an arrangement that automatically logs predefined events based on text analysis.

19. The media asset management system of claim 14, wherein the video server includes an arrangement that automatically logs predefined events based on audio analysis.

20. The media asset management system of claim 15, wherein each said user interface includes a feature that enables the media segments to be viewed.

21. A customizable media asset management system for managing media assets, comprising:
   a logging application that creates indexes of events that occur in the media;
   a video server that captures and digitally stores events logged by the logging application as media segments; and
   a graphical user interface generator that creates customized user interfaces for the logging application based on information entered in a database,
   wherein the creation of the customized user interface is database driven, and
   wherein the customizable media asset management system is located in a networked environment so that users have access thereto using respective user interfaces generated by the graphical user interface generator.

22. The customizable media asset management system of claim 21, wherein the user interface generator is further operable to dynamically generate a logging database for use by said logging application.

23. The customizable media asset management system of claim 21, wherein the graphical user interface generator generates user interface objects for a logging screen for use by a user when using the logging application.

* * * * *